US010313639B2

(12) United States Patent
Wei

(10) Patent No.: US 10,313,639 B2
(45) Date of Patent: Jun. 4, 2019

(54) METHODS AND SYSTEMS FOR LARGE-SCALE DETERMINATION OF RGBD CAMERA POSES

(71) Applicant: Magic Leap, Inc., Dania Beach, FL (US)

(72) Inventor: Xiaolin Wei, Fremont, CA (US)

(73) Assignee: Magic Leap, Inc., Plantation, FL (US)

(*) Notice: Subject to any disclaimer, the term of this patent is extended or adjusted under 35 U.S.C. 154(b) by 148 days.

(21) Appl. No.: 15/356,372

(22) Filed: Nov. 18, 2016

(65) Prior Publication Data

US 2017/0148155 A1    May 25, 2017

Related U.S. Application Data

(60) Provisional application No. 62/258,316, filed on Nov. 20, 2015.

(51) Int. Cl.
    *G06T 7/73*      (2017.01)
    *H04N 9/04*      (2006.01)
    *G06T 7/33*      (2017.01)

(52) U.S. Cl.
    CPC ............... *H04N 9/04* (2013.01); *G06T 7/33* (2017.01); *G06T 7/73* (2017.01); *G06T 2200/04* (2013.01);
(Continued)

(58) Field of Classification Search
None
See application file for complete search history.

(56) References Cited

U.S. PATENT DOCUMENTS 4,635,203 A    1/1987   Merchant
6,078,701 A *   6/2000   Hsu ...................... G06K 9/32
                                            375/E7.086

(Continued)

FOREIGN PATENT DOCUMENTS

WO       2015040119 A1    3/2015
WO   WO 2017/087813 A1    5/2017

OTHER PUBLICATIONS

International Search Report and Written Opinion, for PCT/US2016/062792, dated Feb. 2, 2017. 9 pages.

*Primary Examiner* — Jayanti K Patel
*Assistant Examiner* — Shadan E Haghani
(74) *Attorney, Agent, or Firm* — Kilpatrick Townsend & Stockton LLP

(57) ABSTRACT

A method of determining camera poses includes capturing a plurality of image frames using a camera, computing relative poses between each set of image frame pairs to provide a relative pose set and an uncategorized relative pose set, and detecting and removing miscategorized relative poses to provide a remaining relative pose set. The method also includes determining global poses using the remaining relative pose set and computing extended relative poses for at least a portion of the miscategorized relative poses and at least a portion of the uncategorized relative pose set to provide an extended relative pose set and an extended uncategorized relative pose set. The method further includes detecting and removing extended miscategorized relative poses to provide a remaining extended relative pose set and determining updated global poses for the plurality of image frames using the remaining relative pose set and the remaining extended relative pose set.

26 Claims, 17 Drawing Sheets
(12 of 17 Drawing Sheet(s) Filed in Color)

(52) U.S. Cl.
CPC ............... *G06T 2207/10016* (2013.01); *G06T 2207/10024* (2013.01); *G06T 2207/10028* (2013.01); *G06T 2207/20224* (2013.01); *G06T 2207/30244* (2013.01)

(56) References Cited

U.S. PATENT DOCUMENTS

| | | | |
|---|---|---|---|
| 2005/0243323 A1* | 11/2005 | Hsu | G06K 9/3241 356/450 |
| 2007/0003165 A1* | 1/2007 | Sibiryakov | G06K 9/6211 382/294 |
| 2009/0060348 A1 | 3/2009 | Monro | |
| 2010/0021065 A1* | 1/2010 | Sibiryakov | G06T 3/4038 382/190 |
| 2011/0205340 A1 | 8/2011 | Garcia et al. | |
| 2012/0194516 A1 | 8/2012 | Newcombe et al. | |
| 2013/0201291 A1 | 8/2013 | Liu et al. | |
| 2014/0139639 A1 | 5/2014 | Wagner et al. | |
| 2017/0079607 A1* | 3/2017 | Claus | A61B 6/5211 |
| 2017/0100089 A1* | 4/2017 | Chang | A61B 6/0492 |

\* cited by examiner

METHODS AND SYSTEMS FOR LARGE-SCALE DETERMINATION OF RGBD CAMERA POSES

CROSS-REFERENCES TO RELATED APPLICATIONS

This application claims priority to U.S. Provisional Patent Application No. 62/258,316, filed on Nov. 20, 2015, entitled "Methods and Systems for Large-Scale RGBD Pose Estimation," the disclosure of which is hereby incorporated by reference in its entirety for all purposes.

BACKGROUND OF THE INVENTION 3D reconstruction is one of the most sought-after topics in 3D computer vision, which has a wide variety of applications in mapping, robotics, virtual reality, augmented reality, architecture, game, film making, and etc. A 3D reconstruction system can take images, in RGB (red-green-blue), RGBD (red-green-blue-depth), or depth-only format as input and generate a 3D representation, e.g., 3D meshes, of the images. Among processing procedures of the 3D reconstruction system, one of the critical components is pose estimation: recovering each camera pose associated with each input image. The camera pose may include a focal length, a position, and/or a rotation direction and angle of the camera.

Most recently, with the availability of low-cost RGBD sensors, such as Kinect, Google Tango, and Intel Realsense, RGBD images can be readily captured with such available devices and be used for 3D reconstruction.

For the purpose of reconstructing high-quality 3D meshes, however, the accuracy requirement is extremely high. The camera poses should be both globally and locally consistent. Present technologies, however, are not able to provide a robust and accurate end-to-end framework solution for pose estimation of RGBD images for large-scale scenes.

SUMMARY OF THE INVENTION

The present invention relates generally to methods and systems for determining the position and orientation (i.e., pose) of a camera as a function of time. More particularly, embodiments of the present invention provide methods and systems for determining camera pose in a global reference frame based, at least in part, on relative camera poses between image frames. The invention is applicable to a variety of applications in computer vision and 3D reconstruction.

According to an embodiment of the present invention, a method of determining camera poses for a plurality of image frames is provided. The method includes capturing the plurality of image frames using a camera, computing relative poses between each set of image frame pairs to provide a relative pose set and an uncategorized relative pose set, and detecting and removing miscategorized relative poses from the relative pose set to provide a remaining relative pose set. The method also includes determining global poses for the plurality of image frames using the remaining relative pose set and computing extended relative poses for at least a portion of the miscategorized relative poses and at least a portion of the uncategorized relative pose set to provide an extended relative pose set and an extended uncategorized relative pose set. The method further includes detecting and removing extended miscategorized relative poses from the extended relative pose set to provide a remaining extended relative pose set and determining updated global poses for the plurality of image frames using the remaining relative pose set and the remaining extended relative pose set.

According to another embodiment of the present invention, a non-transitory computer-readable storage medium comprising a plurality of computer-readable instructions tangibly embodied on the computer-readable storage medium, which, when executed by a data processor, determining camera poses for a plurality of image frames, is provided. The plurality of instructions include instructions that cause the data processor to capture the plurality of image frames using a camera, instructions that cause the data processor to compute relative poses between each set of image frame pairs to provide a relative pose set and an uncategorized relative pose set, and instructions that cause the data processor to detect and remove miscategorized relative poses from the relative pose set to provide a remaining relative pose set. The plurality of instructions also include instructions that cause the data processor to determine global poses for the plurality of image frames using the remaining relative pose set and instructions that cause the data processor to compute extended relative poses for at least a portion of the miscategorized relative poses and at least a portion of the uncategorized relative pose set to provide an extended relative pose set and an extended uncategorized relative pose set. The plurality of instructions further include instructions that cause the data processor to detect and remove extended miscategorized relative poses from the extended relative pose set to provide a remaining extended relative pose set and instructions that cause the data processor to determine updated global poses for the plurality of image frames using the remaining relative pose set and the remaining extended relative pose set.

Numerous benefits are achieved by way of the present invention over conventional techniques. For example, embodiments of the present invention provide methods and systems for determining camera pose in a global reference frame that can be used in subsequent 3D reconstruction. Moreover, embodiments of the present invention provide methods and systems for determining camera poses that are not only globally consistent, but also locally consistent. Additionally, embodiments of the present invention are robust to well-known difficult cases, such as scenes with repeated patterns, scenes with a lack of features, sudden camera movement, and multi-room settings. These and other embodiments of the invention along with many of its advantages and features are described in more detail in conjunction with the text below and attached figures.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which constitute a part of this disclosure, illustrate several embodiments and, together with the description, serve to explain the disclosed principles.

DETAILED DESCRIPTION OF SPECIFIC EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Figure 1:
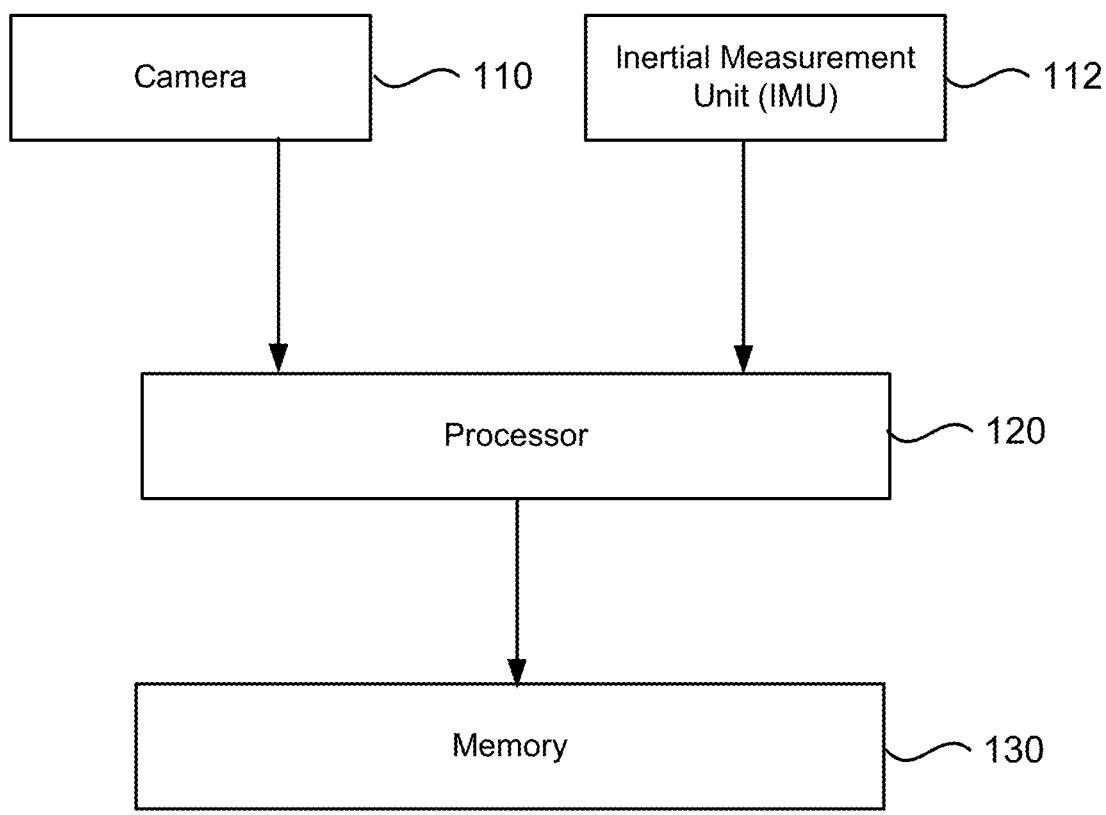
FIG. 1 is a block diagram illustrating a system for large-scale RGBD pose estimation, according to an exemplary embodiment.

FIG. 1 is a block diagram illustrating a system 100 for large-scale RGBD pose estimation, according to an exemplary embodiment. The system may include a camera 110, a processor 120, and a memory 130. Some component may be optional. Some component may be local, online, or cloud-based.

The camera may capture RGB, RGBD, or depth-only information of a plurality of scenes and transmit such information to the processor. The RGB, RGBD, or depth-only information may be in a still formation (i.e., a picture) or in a video format comprising at least one frame. In a particular embodiment, the camera is an RGBD video camera capturing frames, for example, at a predetermined frame rate. The camera may be an independent device or a part of a single device comprising the camera, the processor, and the memory. The camera may also be a plurality of cameras, for example, a first camera capturing RGB information and a second camera capturing depth information.

The memory may be a non-transitory computer-readable storage medium storing instructions that when executed by the processor, perform the method(s)/step(s) described below.

In some embodiments, the processor and the memory can be cloud-based and independent of the camera. Pictures or videos can be captured by the camera, e.g. a cellphone camera, and can be uploaded to one or more (cloud-based) servers. The server or servers may include one or more of the processors and one or more of the memories, which implement the methods/steps described below. As described more fully herein, embodiments of the present invention receive RGBD input (e.g., a video stream) and output a world coordinate of the camera pose for each frame captured using the camera. Using this information, each frame can be related to each other frame, resulting in availability of the camera trajectory, which describes how the camera moves through the world, as the frames are captured. Thus, some embodiments of the present invention convert input RGBD video streams into camera pose as a function of time, for example, mapped to the time each frame was captured, which can then be used in 3D image reconstruction applications. Additional description related to 3D reconstruction and 3D meshes is provided in relation to FIGS. 13A-13C and U.S. patent application Ser. No. 15/274,823, filed on Sep. 23, 2016, and entitled "Methods and Systems for Detecting and Combining Structural Features in 3D Reconstruction," the disclosure of which is hereby incorporated by reference in its entirety for all purposes.

The camera 110 can output RGBD images as well as camera intrinsic parameters, including focal length, camera resolution, principal point, one or more distortion parameters, and the like. Referring once again to FIG. 1, in addition to camera 110, the system includes an inertial measurement unit (IMU) 112. The IMU can be utilized to collect data on the relative position and orientation of the camera associated with each frame or as a function of time. The IMU data can include angular velocity, acceleration, and the direction of gravity. Using these parameters, the x/y/z position in a reference frame as well as pitch/yaw/roll orientation in the reference frame can be determined.

Figure 2:
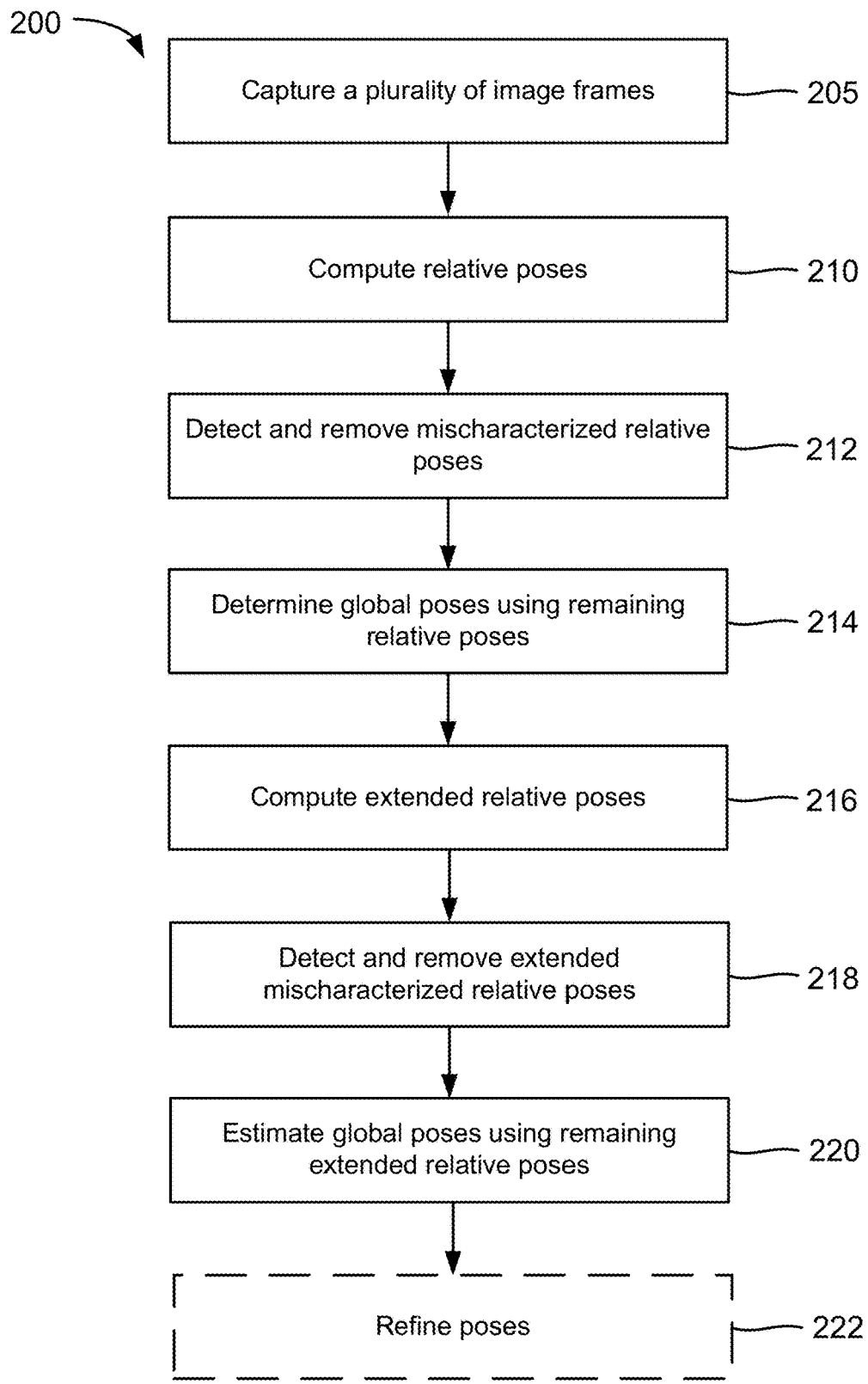
FIG. 2 is a simplified flowchart illustrating a method of performing large-scale RGBD pose estimation according to an embodiment of the present invention.

FIG. 2 is a simplified flowchart illustrating a method of performing large-scale RGBD pose estimation according to an embodiment of the present invention. The method includes a number of steps, some of which may be optional. The method may comprise a framework to achieve large-scale RGBD pose estimation.

In this disclosure, the "pose" (i.e., position and orientation) may refer to a pose or a series of poses of a camera while capturing images or scenes. The series of poses may be time dependent and/or position dependent. The pose may include a position (e.g., measured in a reference frame) and an orientation (e.g., also measured in a reference frame that can be the same as the reference frame), which can be decomposed into a rotation direction and a rotation angle.

The method includes capturing a plurality of image frames (205) and computing a relative pose between image frames (210). Computing the relative pose between image frames can include estimating relative pose changes between each image pair if there are sufficient overlapping areas between the RGBD image pair, i.e., the same objects or the same portion of the scene showing up in both images as discussed in relation to FIGS. 4A-4D. An example of two camera poses, in which a relative pose between a pair of RGBD images associated with these two camera poses can be computed, is discussed with respect to FIGS. 4A/4B and FIG. 5A. In the relative pose computation, sufficient scene overlaps may be found, for example, in two situations: (1) temporally close image frames usually have sufficient scene overlap to determine a relative pose; (2) image frames having sufficient feature matches may have scene overlap.

Figure 6A:
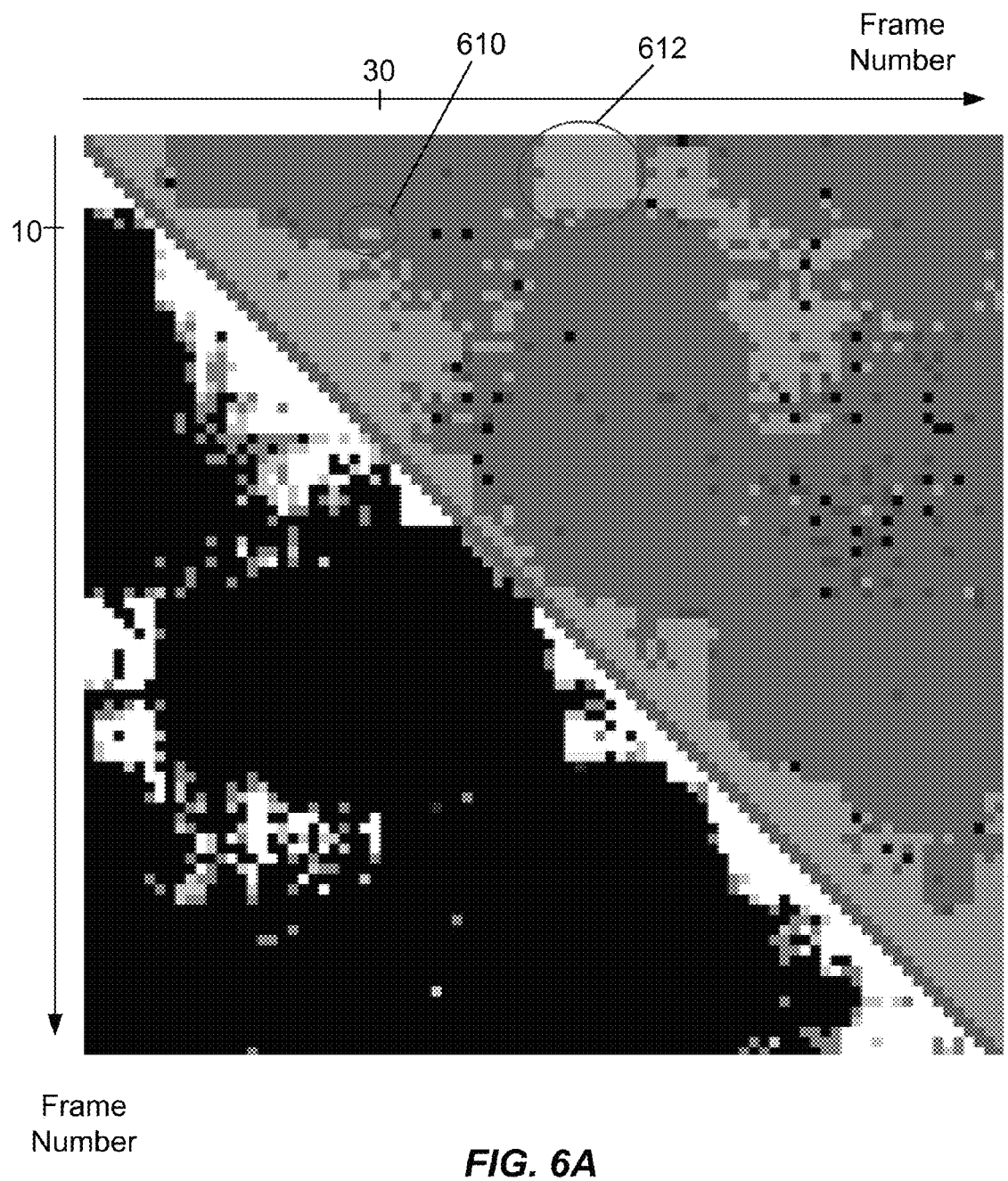
FIG. 6A is a matrix representation of relative poses according to an embodiment of the present invention.

An example of relative poses of an entire RGBD sequence is represented as a pose matrix in FIG. 6A. Additional details related to computing the relative pose is described more fully below with reference to FIG. 3.

Figure 3:
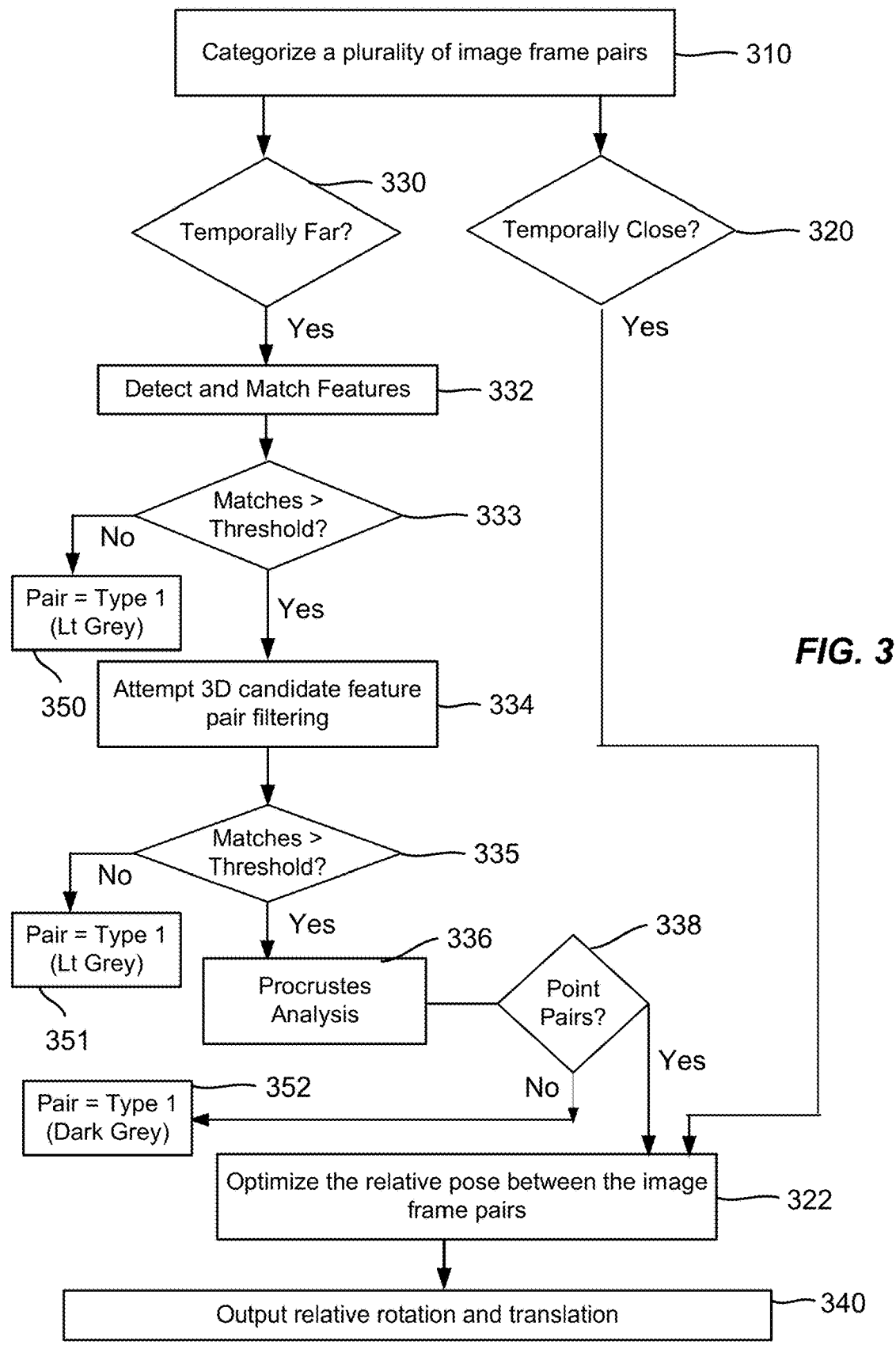
FIG. 3 a simplified flowchart illustrating a method for computing relative pose between image frames according to an embodiment of the present invention.

As discussed in additional detail in relation to FIG. 3, the relative pose computation (210) can build and recover relative poses between image frame pairs. The input RGBD image set can be individual RGBD images taken at different times or a RGBD video stream consisting of a plurality of continuous frames. The method/framework described in this disclosure can work with both cases, but, without losing generality, a RGBD video stream is used as an example.

FIG. 3 a simplified flowchart illustrating a method for computing relative pose between image frames according to an embodiment of the present invention. Referring to FIG. 3, the method includes categorizing a plurality of image frame pairs based on a threshold of a temporal separation between the frames (310). For example, the threshold may be 2 seconds, but the present invention is not limited to this threshold and other values can be utilized, for example, less than 1/15 sec, 1/10 sec, 1/6 sec, 1/5 sec, 1/2 sec, 1 sec, 3 sec, 4 sec, 5 sec, or more than 5 seconds. In an embodiment, a pair of image frames captured within 2 seconds of each other are categorized as "temporally close" image frames (320). If a pair of image frames are captured with a delay between frame capture of more than the threshold, then these image frame pairs are categorized as "temporally far" frames (330). An example of a pair of image frames are the images illustrated in FIGS. 4A and 4B, which were captured at different times and from different camera poses.

For temporally close image frames, the assumption can be made that the camera pose is not changing significantly between the image frames. Accordingly, relative pose optimization (322) can be performed for temporally close image frames since the initial relative pose should be close to the optimized relative pose. Thus, for temporally close frames, the identity matrix can be directly used as the initialization to perform relative pose optimization (322). As an example, the depth data from the temporally close frames can be aligned to provide the optimized relative pose between the image frames. For instance, an ICP (iterative closest point) based alignment can be utilized with the depth data to optimize the relative pose. Referring to FIG. 6A, the temporally close image frame pairs are adjacent the main diagonal of the matrix.

For temporally far image frame pairs, it is less likely to find significant overlap between image frames as a result of changes in the camera pose. As a result, initialization is provided by processes 332, 334, and 336. For temporally far image frame pairs, the method includes performing feature detection and feature matching (332) using the RGB data for the image frames to provide a set of candidate feature pairs having sufficient scene overlap. The feature detection may be achieved by methods including scale-invariant feature transform (SIFT), speeded up robust features (SURF), features from accelerated segment test (FAST), or the like. Feature matching may be achieved by methods including vocabulary-tree based methods or Kd-tree based methods.

Figure 4A:
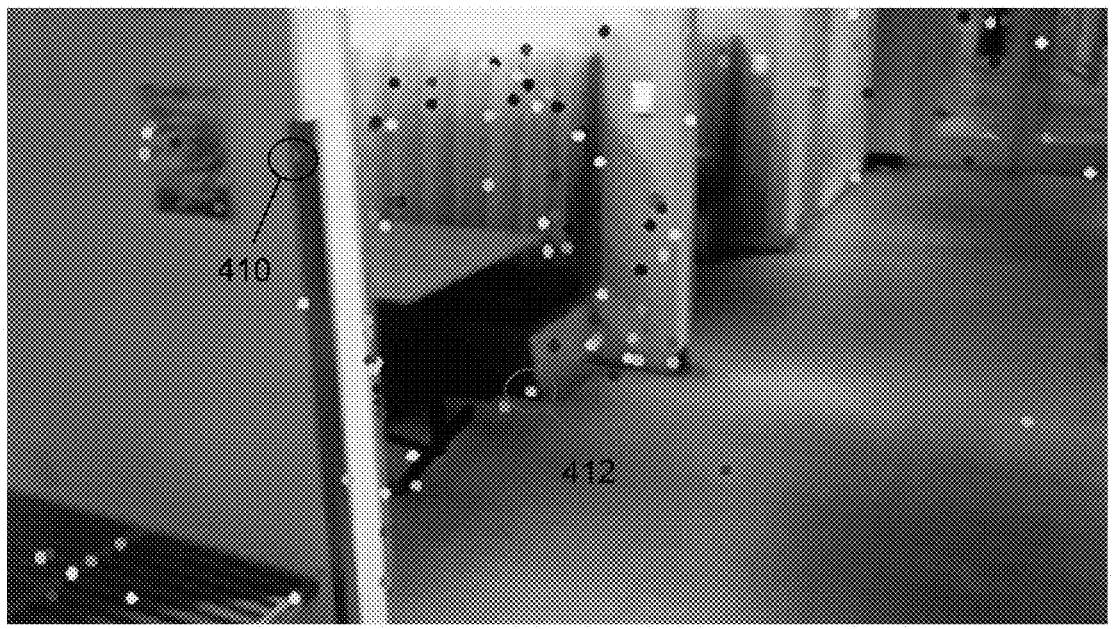
FIG. 4A is a first RGB image frame captured from a first camera pose and marked with detected and matched features based on feature descriptors according to an embodiment of the present invention.
Figure 4B:
FIG. 4B is a second RGB image frame captured from a second camera pose and marked with detected and matched features based on feature descriptors according to an embodiment of the present invention.
Figure 4C:
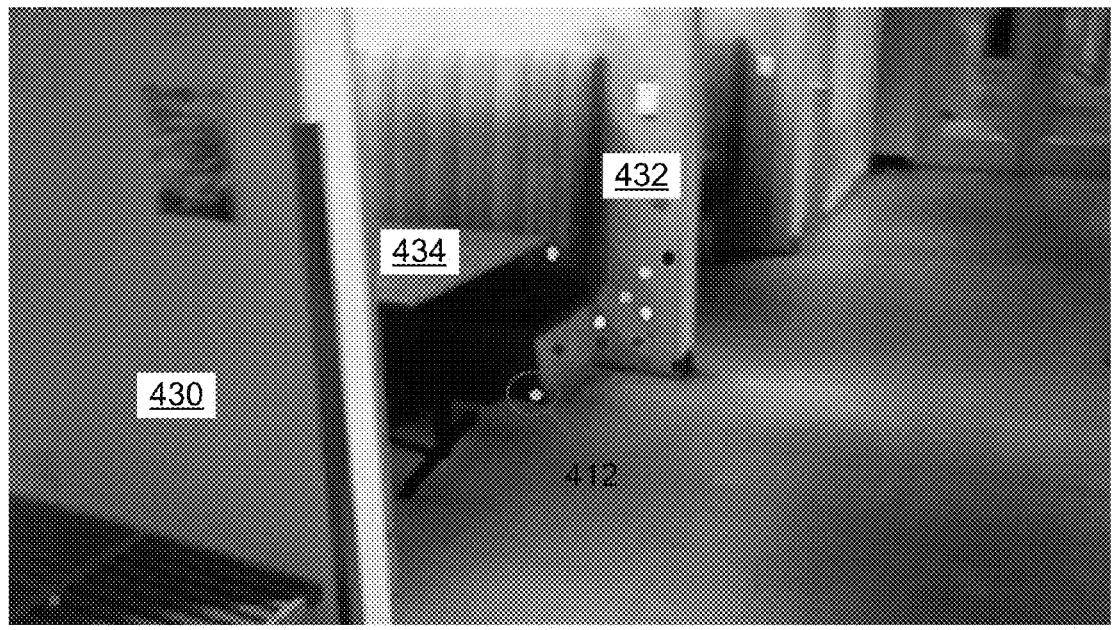
FIG. 4C is the first RGB image frame illustrated in FIG. 4A marked with feature matches produced after 3D feature filtering according to an embodiment of the present invention.
Figure 4D:
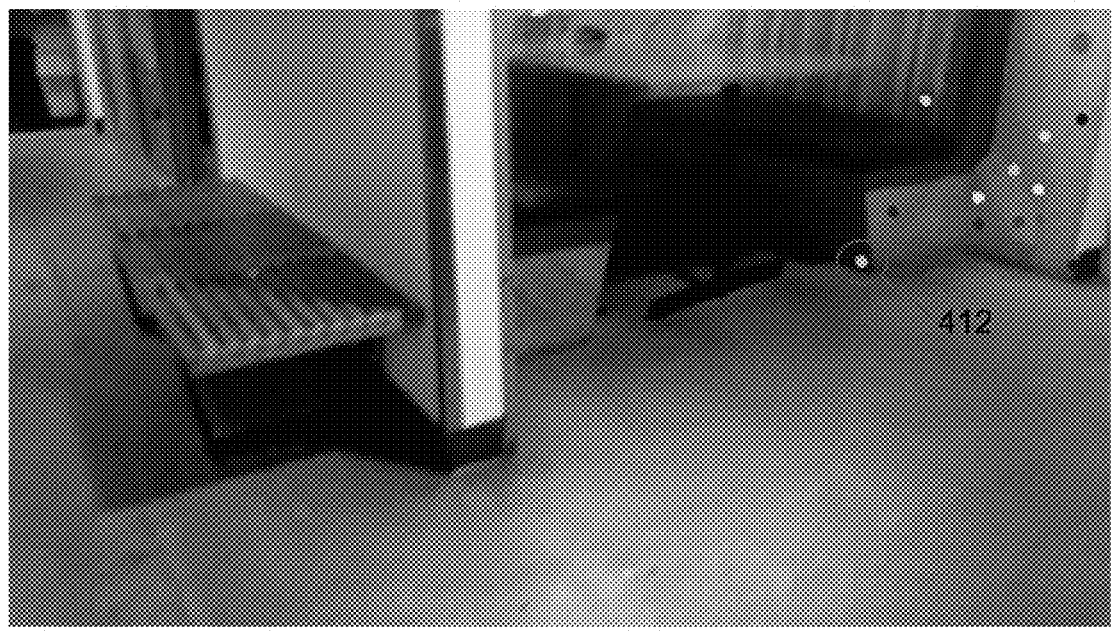
FIG. 4D is the second RGB image frame illustrated in FIG. 4B marked with feature matches produced after 3D feature filtering according to an embodiment of the present invention.

FIG. 4A is a first RGB image frame captured from a first camera pose and marked with detected and matched features based on feature descriptors according to an embodiment of the present invention. FIG. 4B is a second RGB image frame captured from a second camera pose and marked with detected and matched features based on feature descriptors according to an embodiment of the present invention. FIG. 4C is the first RGB image frame illustrated in FIG. 4A marked with feature matches produced after 3D feature filtering according to an embodiment of the present invention. FIG. 4D is the second RGB image frame illustrated in FIG. 4B marked with feature matches produced after 3D feature filtering according to an embodiment of the present invention, for example, following process 336 in FIG. 3.

Referring to FIGS. 4A and 4B, the detected/matched features that are matched between the two image frames illustrated in FIGS. 4A and 4B, respectively, are indicated by the dots of various colors overlaid on the RGB image. Once the features have been detected, a descriptor is computed for each feature based on its neighboring pixels. The feature descriptors are then used to match features between the image frames, for example, by applying a threshold to the distance between feature descriptors. One of ordinary skill in the art would recognize many variations, modifications, and alternatives.

By way of illustration, through the implementation of feature detection and feature matching, detected and matched features can be labeled by pairs of dots on the image frames, with each dot locating the particular feature in each image frame. Referring to FIGS. 4A and 4B, a feature represented by red dot 410 is detected and matched in both image frames. Additionally, a second feature represented by aqua dot 412 is also detected and matched in both image frames. As illustrated in FIGS. 4A and 4B, the red dot 410 and the red dot 411 in the two image frames include a dark material on one side and a lighter material on the other side. However, although color characteristics are similar or the same, these areas are located at very different locations from each other, i.e., red dot 410 in FIG. 4A is located on the wall next to the bench, but red dot 411 in FIG. 4B is located on the edge of the seat back. Thus, as illustrated in FIGS. 4C and 4D, both features 410 and 411 (and the matches between them) are not present once 3D feature filtering has been performed. Thus, a subset of the initially detected and matched features will typically be kept after 3D filtering.

A determination is made if the number of feature matches exceeds a predetermined threshold, for example, 10 feature matches (333). If the number of feature matches is below the threshold, then the image frame pair being analyzed is defined as a Type 1 uncategorized image frame pair (350). In FIG. 6A, these uncategorized Type 1 pairs are illustrated in light grey, indicating that no relative pose is present and that no attempt was made to compute the relative pose between image frame pairs, in this case, because of the low number of feature matches.

The method also includes, if the number of feature matches exceeds the predetermined threshold, attempting candidate feature pair filtering (334), which can also be referred to as 3D feature filtering. The features obtained after feature detection and matching (332) are back-projected onto the associated depth images to get corresponding 3D points of the 2D features. In an embodiment, the candidate feature pairs are filtered using a random sample consensus (RANSAC) algorithm on top of all the back-projected 3D feature matches to obtain frame pairs with at least K (K being a preset number) inlier matches. FIG. 4C and FIG. 4D show matched 3D features pairs after candidate feature filtering using RANSAC, with K=10. As will be evident to one of skill in the art, the optimum set of feature matches that maximize the frame-to-frame match can be found using the methods described herein.

As discussed above, candidate feature pairs are analyzed to determine if the number of 3D feature matches exceed a second predetermined threshold, for example, 10 3D feature matches (335). If the number of feature matches is below the second predetermined threshold, then the image frame pair being analyzed is defined as a Type 1 uncategorized image frame pair (351). In FIG. 6A, these uncategorized Type 1 pairs are illustrated in light grey, indicating that no relative pose is present and that no attempt was made to compute the relative pose between image frame pairs, in this case, because of the low number of 3D feature matches.

Figure 5A:
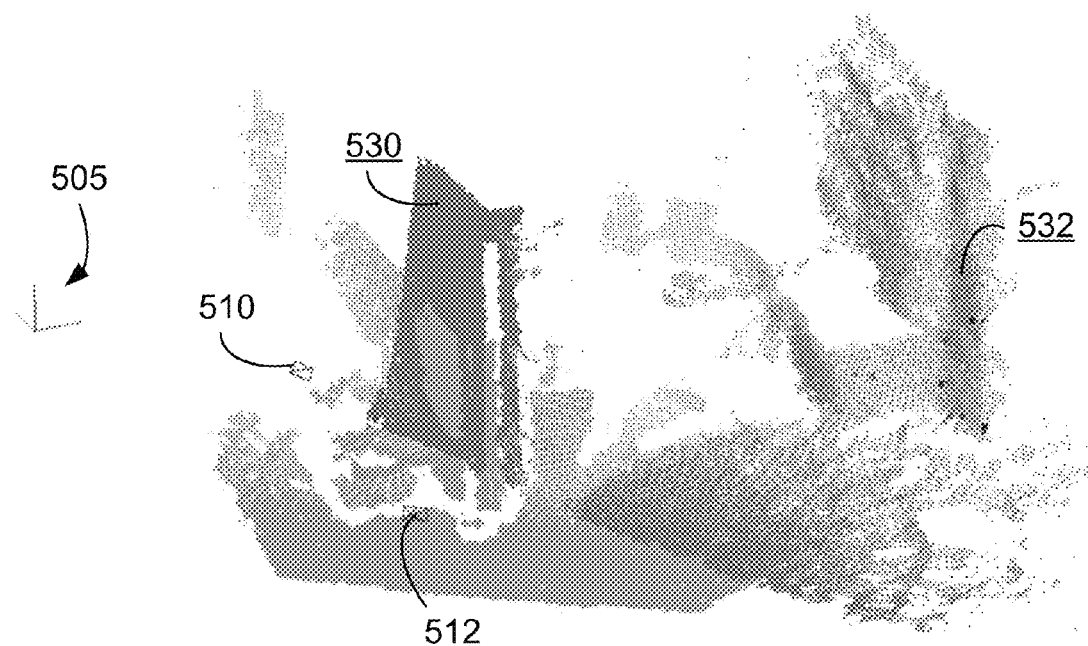
FIG. 5A illustrates a perspective view of a set of point clouds associated with two different camera poses according to an embodiment of the present invention.
Figure 5B:
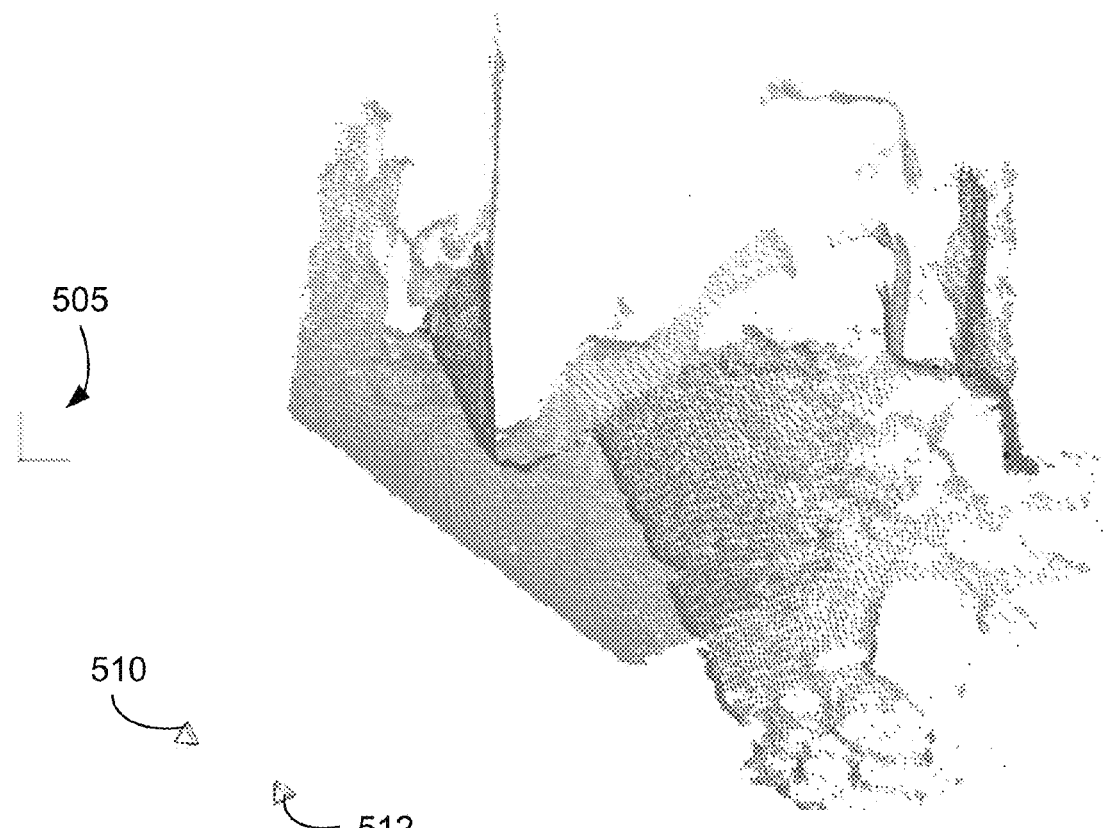
FIG. 5B illustrates a plan view of the set of point clouds associated with the two different camera poses illustrated in FIG. 5A according to an embodiment of the present invention.

If the number of 3D feature matches exceeds the second threshold, then Procrustes Analysis is conducted (336) on the inlier 3D feature matches obtained after process 334. During this analysis process, a least square solution of the relative transformation (i.e., relative pose) between the image pairs is estimated. As an example, a set of point clouds associated with image pairs are illustrated in FIGS. 5A and 5B. FIG. 5A illustrates a perspective view of a set of point clouds associated with two different camera poses according to an embodiment of the present invention. An intermediate result of the relative pose calculation is illustrated in FIG. 5A. FIG. 5B illustrates a plan view of the set of point clouds associated with the two different camera poses illustrated in FIG. 5A according to an embodiment of the present invention. Global reference frame 505 is illustrated in FIGS. 5A and 5B. An intermediate result of the relative pose calculation is illustrated in FIG. 5A. Thus, FIGS. 5A and 5B illustrate the same relative pose from two different viewpoints: a perspective or tilted view in FIG. 5A and a top-down or plan view in FIG. 5B. In both FIGS. 5A and 5B, camera pose 510 corresponds to a camera pose capturing the grey point cloud and camera pose 512 corresponds to a camera pose capturing the red point cloud.

Referring to FIGS. 5A and 5B, the grey point cloud represents a 3D depth map corresponding to the image illustrated in FIG. 4A and the red point cloud represents a 3D depth map corresponding to the image illustrated in FIG. 4B. The wall 430 in FIG. 4C is present as section 530 in FIG. 5A. Additionally, wall 432 adjacent the table 434 in FIG. 4C is present as section 532 in FIG. 5A. Using these point clouds, a least square solution can be used in an embodiment to provide the initialization utilized during relative pose optimization (322). It should also be noted that the matches illustrated in FIGS. 4C and 4D are overlaid on the depth maps illustrated in FIGS. 5A and 5B, and can be utilized in pose alignment processes.

Returning to the discussion of temporally close frames, the identity matrix can be directly used as the initialization provided to the relative pose optimization (322). The output provided after Procrustes analysis can also be used as the input for the relative pose optimization process (322) after an analysis of the number of closest point pairs as described below.

A determination is made if there are a sufficient number of closest point pairs between the temporally far image frame pair, i.e., is the number of closest point pairs greater than a third predetermined threshold. Additional description related to determining the number of closest point pairs is provided in relation to FIG. 9. If there is a sufficient number, the process continues to process 322. If there are not a sufficient number of closest point pairs, then the frame pair undergoing analysis is identified as a Type 1 uncategorized frame pair 352 (e.g., a dark grey frame pair since an attempt was made to compute the relative pose between the image frame pairs, but no relative pose between image frame pairs was present).

In some embodiments, determination if there are a sufficient number of closest point pairs as well as the optimization process discussed in relation to process 322 are combined as a single process, providing an output including the identification of both uncategorized frame pairs as well as valid relative pose between other frame pairs. In these embodiments, the dark grey frame pairs are identified as having a relative pose computation attempted, but the frame pair was identified as uncategorized during the initial portion of the relative pose optimization process. One of ordinary skill in the art would recognize many variations, modifications, and alternatives.

Figure 5C:
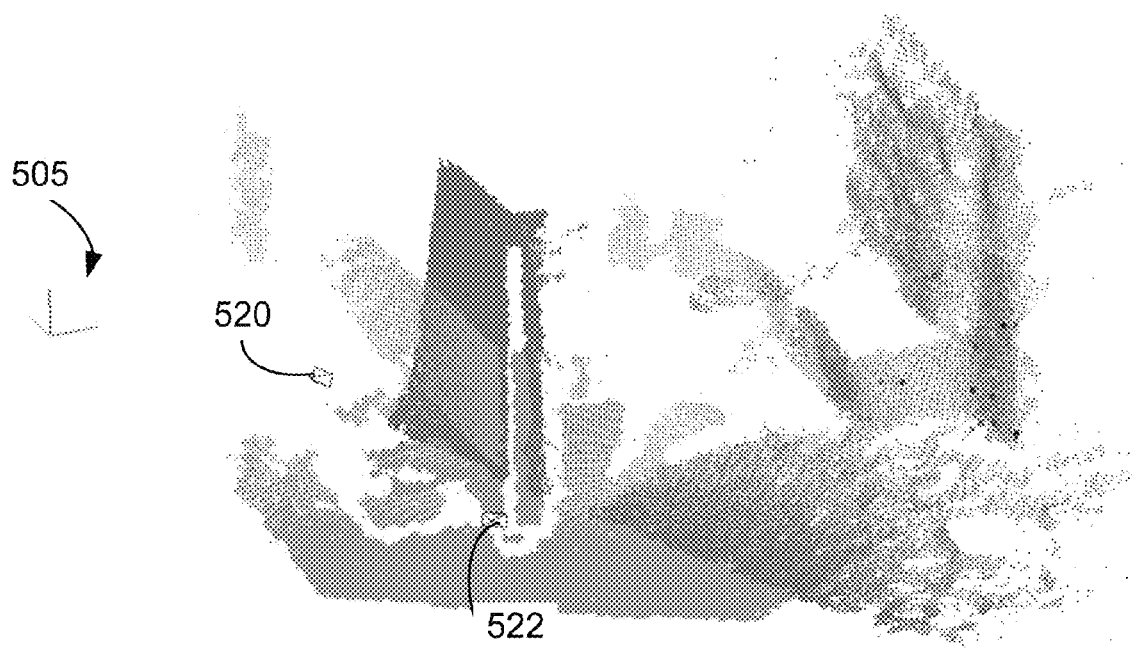
FIG. 5C illustrates a perspective view of a set of point clouds associated with the two different camera poses illustrated in FIG. 5A, with an optimized relative pose, according to an embodiment of the present invention.
Figure 5D:
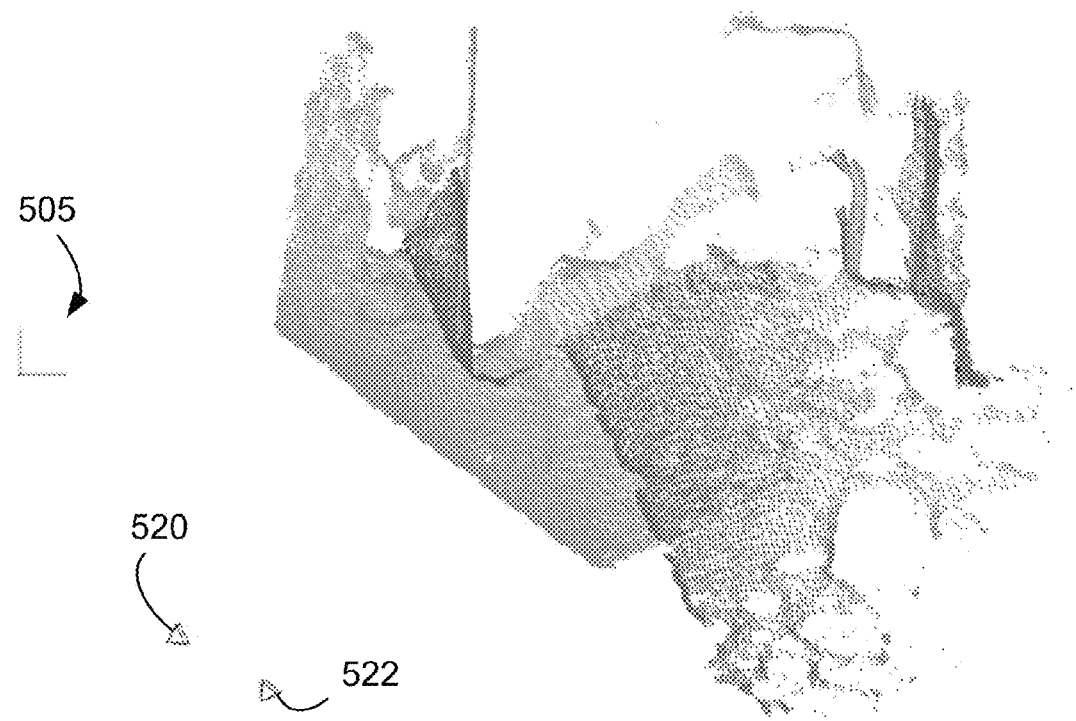
FIG. 5D illustrates a plan view of the set of point clouds associated with the two different camera poses illustrated in FIG. 5C, with an optimized relative pose, according to an embodiment of the present invention.

The relative pose optimization process (322) may use numerical optimization to refine the initial relative pose solution (e.g., the relative poses illustrated in FIG. 5A and FIG. 5B) to provide an optimized relative pose solution (e.g., the relative poses 520 and 522 illustrated in FIGS. 5C and 5D). The optimization can include optimizing with closest point constraints, boundary point constraints, 3D feature constraints, IMU rotation constraints, or the like. Closest point constraints can measure how well two depth images are aligned. Boundary point constraints can measure how well object boundaries in two depth images are aligned. 3D feature constraints can penalize discrepancy of the matched feature 3D distances between two frames. IMU rotation constraints can ensure that the relative rotation between a pair is close to IMU-measured relative rotation.

Relative poses produced from relative pose optimization (322) are shown in FIG. 5C and FIG. 5D, which are, correspondingly, more accurate than the poses provided by the initialization (following 310 for temporally close poses, following 336 or 338 for temporally far poses) as illustrated in FIG. 5A and FIG. 5B.

The output of the method illustrated in FIG. 3 is the relative rotation and translation between the plurality of image frame pairs (340). Thus, in summary, FIG. 3 illustrates the method used to compute the relative pose (210).

It should be appreciated that the specific steps illustrated in FIG. 3 provide a particular method of computing relative pose between image frames according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring once again to FIG. 2, the method includes detecting miscategorized poses (212). As described herein, the relative poses between image frames are utilized to perform global pose estimation. However, some relative poses computed from step 210 may not be correct. The inventors have determined that a large number of miscategorized relative poses may cause the global pose estimation process (step 214) to fail. Thus, embodiments of the present invention provide a Miscategorized Pose Detection process (step 212), during which each relative pose determined in step 210 is analyzed to filter out miscategorized relative poses and separate the image frame pairs with miscategorized relative poses from those with valid relative poses. Miscategorized relative poses, in this disclosure, may include poses that cannot or should not be used for the pose estimation.

Miscategorized relative poses may occur under a number of circumstances including: (1) repeated patterns; (2) wrong 3D feature filtering (e.g., wrong RANSAC matches); and (3) local minima in relative pose optimization. For example, FIGS. 7A and 7B show an image pair with miscategorized relative poses.

Figure 7A:
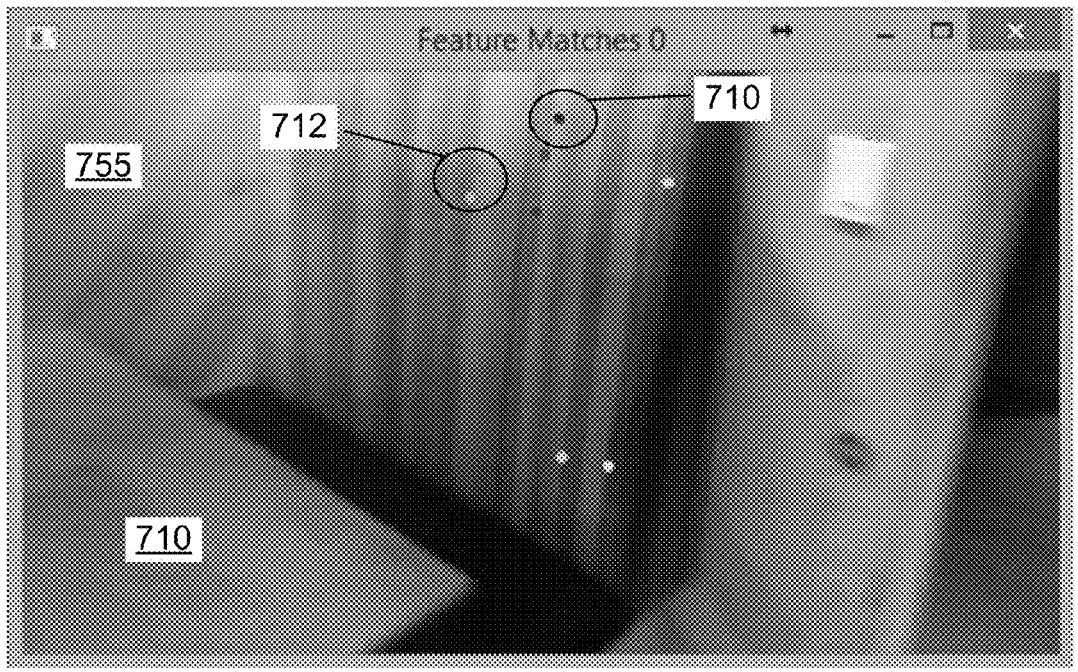
FIGS. 7A and 7B are RGB images for two image frames according to an embodiment of the present invention.
Figure 7B:
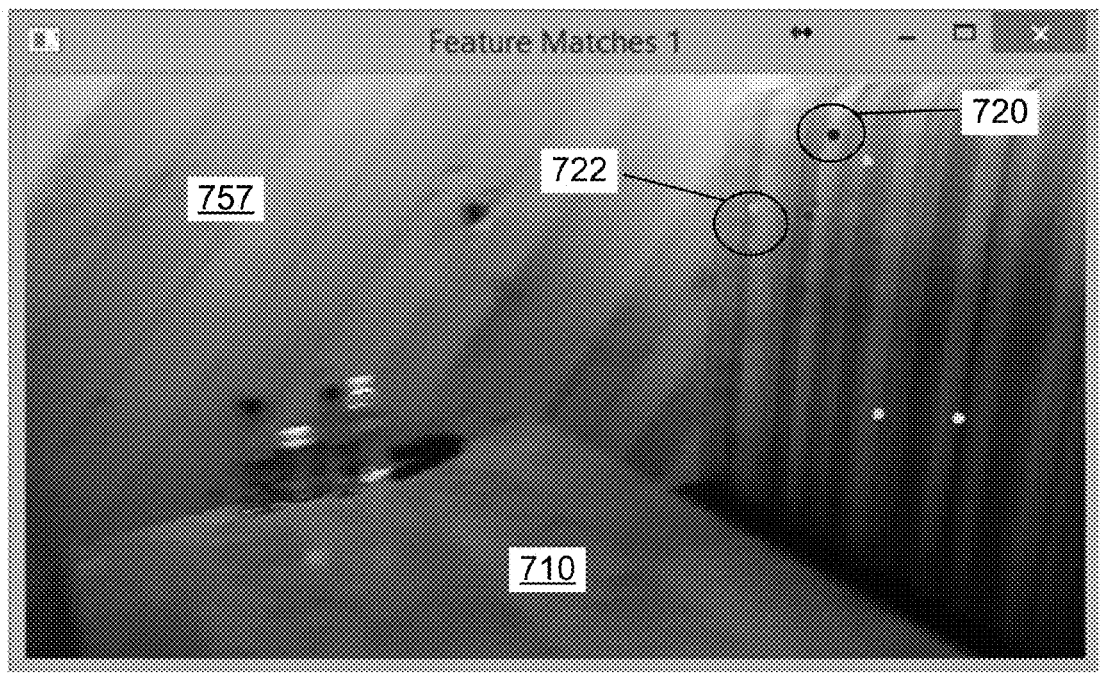

FIGS. 7A and 7B are RGB images for two image frames according to an embodiment of the present invention. Referring to FIG. 7A, the seat back on the back of the bench is included in the image frame. The seat back includes a number of vertical stripes characterized by a repeating pattern. Referring to FIG. 7B, the left side of the seat back is included in the image frame. During feature detection and matching, features 710 and 712 in FIG. 7A were detected. Features 720 and 722 in FIG. 7B were detected and matched to features 710 and 712. It is likely that this incorrect match resulted from the repeating pattern of stripes in the seat back. Thus, features 710 and 712 near the middle of the seat back were incorrectly matched with features 720 and 722, respectively on the left side of the seat back. This incorrect matching can result in determining that a pair of image frames have a relative pose alignment to each other when, in fact, the image frames do not have any overlapping areas. As described below, mischaracterized poses, resulting, for example, from the incorrect color matching discussed above, are detected and removed by embodiments of the present invention.

According to embodiments of the present invention, several different mechanisms can be used to detect and filter miscategorized poses, also referred to as inaccurate or incorrect relative poses, including Rotation and Position, IMU Measurement, Occlusion, Aligned Point Count, and Pixel-wise Difference, each of which are described more fully below. In some implementations, image frame pairs passing rules related to detection of mischaracterized poses are utilized in subsequent pose estimation processes.

Rotation and Position. This mechanism can apply to temporally close pairs. Because these pairs are captured at close timestamps (given the video stream example used), there should be only a small amount of movement in each pair. Therefore, a temporally close pair can be discarded if a computed relative rotation or position is too large (e.g., over a predetermined threshold).

IMU Measurement. This mechanism compares a difference between estimated relative position and/or rotation from step 210 (i.e., the output of process step 340) and the relative position and/or rotation computed from IMU measurements with a predetermined threshold. The IMU provides information on the position and orientation of the camera associated with each image frame. In some embodiments, the IMU measurements can have a degree of inaccuracy associated with either position, orientation, or position and orientation. Thus, embodiments of the present invention utilize IMU measurements in conjunction with other information.

Figure 6B:
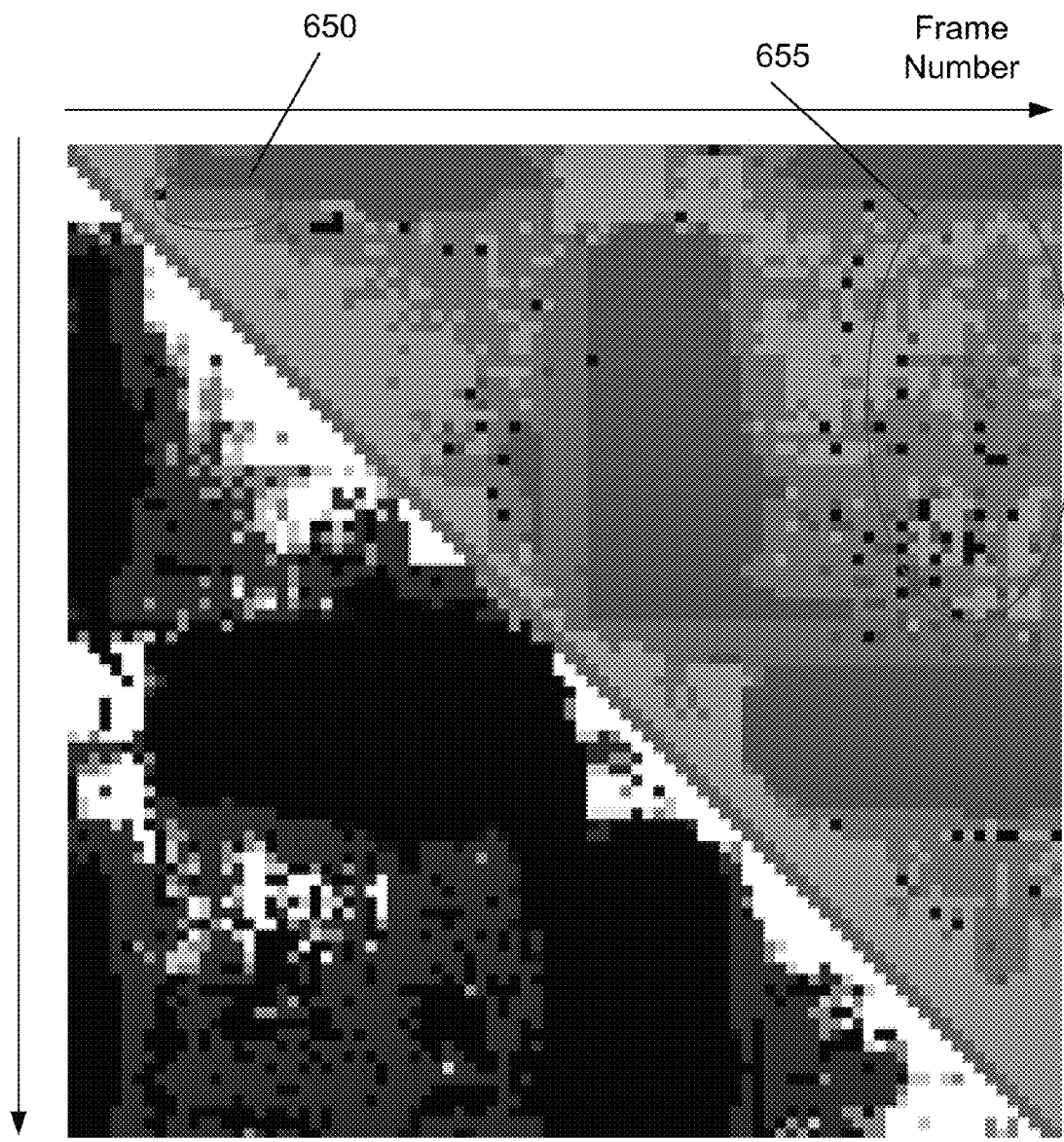
FIG. 6B is a matrix representation of extended relative poses according to an embodiment of the present invention.

The IMU measurements (or information based on these measurements) for image frame pairs can be compared and if the difference between the IMU measurements is over the threshold for a given image pair, then the given image pair can be identified as having a miscategorized relative pose as is illustrated in the image pairs represented by orange (Type 4) pixels in FIG. 6A or 6B. For these image pairs, the relative pose can be disregarded during the global pose estimation process by classifying the image frame pair as having a miscategorized relative pose.

Figure 6C:
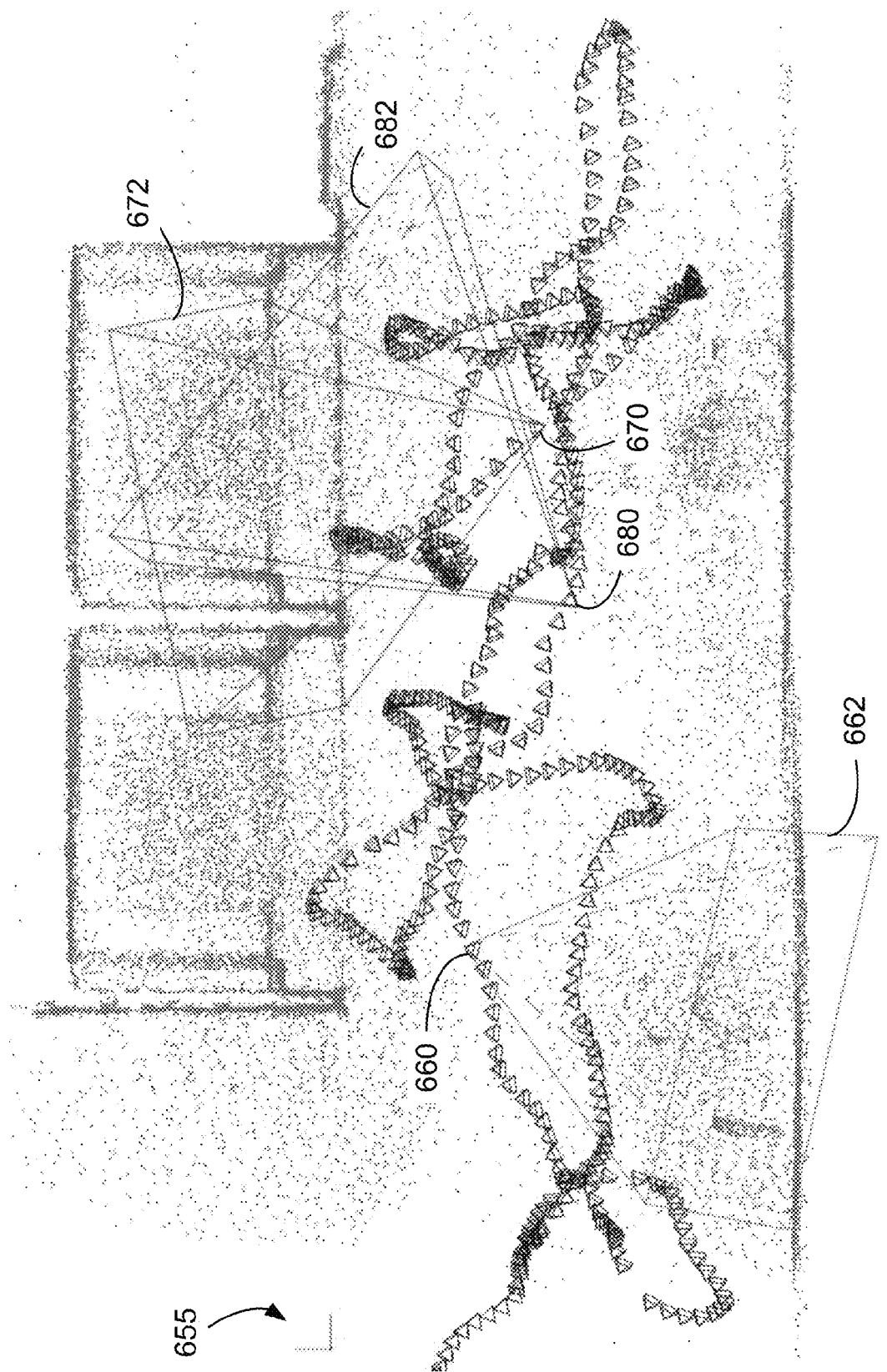
FIG. 6C is a diagram illustrating a series of camera poses and image frames according to an embodiment of the present invention.

Referring to FIG. 6C, camera pose 660 has a position and an orientation to the lower left quadrant of the area. Camera pose 680 has a position and an orientation to the upper right quadrant of the area. It is possible that common features could be present in both image frames 662 and 682. For example, if the camera was moving through a courtyard of a complex of similar buildings, both image frames could share common elements as they image these similar buildings. As a result, the relative pose computation could determine that a valid relative pose existed. However, the IMU measurement would provide information on the orientation of the camera at the different times, which are substantially opposite to each other. As a result, using the IMU measurements, the initial relative pose computation for these image frames would be updated to indicate that a miscategorized relative pose has been determined. One of ordinary skill in the art would recognize many variations, modifications, and alternatives.

Figure 7C:
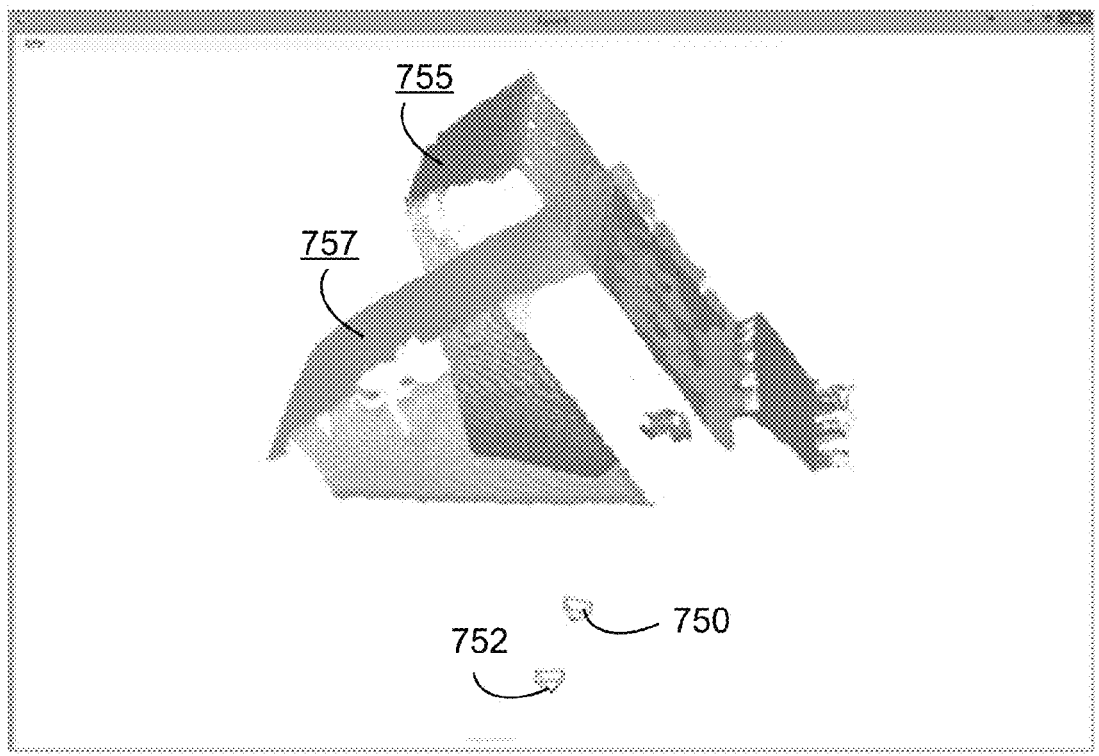
FIG. 7C illustrates a perspective view of a set of point clouds associated with the RGB images in FIGS. 7A and 7B.
Figure 7D:
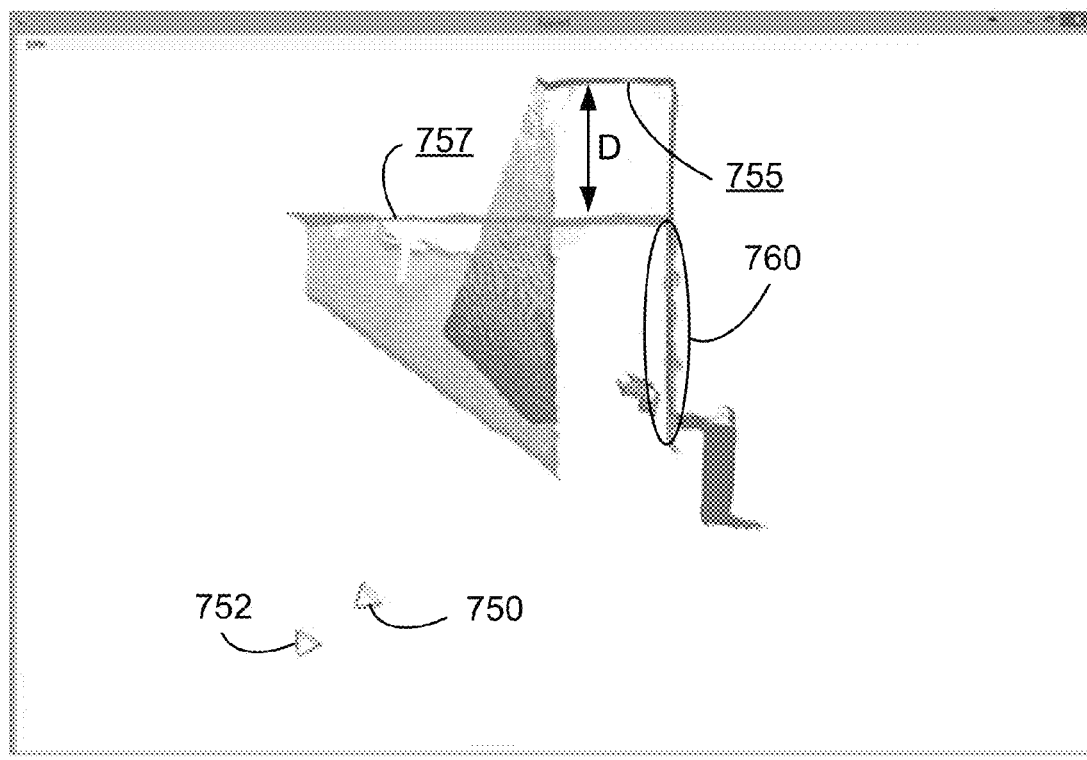
FIG. 7D illustrates a plan view of the set of point clouds associated with the RGB images in FIGS. 7A and 7B.

Occlusion. This mechanism can examine depth maps and camera poses of an image pair in 3D, and determine if their relative pose is correct via a visibility check. FIGS. 7C and 7D describe an example of determining mutually occluded depth maps from two different views of superimposed images. In both FIGS. 7C and 7D, the relative pose is incorrect. As a result, their relative pose should be detected as a miscategorized pose and be disregarded.

FIG. 7C illustrates a perspective view of a set of point clouds associated with the RGB images in FIGS. 7A and 7B. FIG. 7D illustrates a plan view of the set of point clouds associated with the RGB images in FIGS. 7A and 7B. Referring to FIG. 7C, camera pose 750 corresponds to a camera pose capturing the grey point cloud, which is associated with the RGB image in FIG. 7A. Camera pose 752 corresponds to a camera pose capturing the red point cloud, which is associated with the RGB image in FIG. 7B. The alignment between the depth maps is based on the matching of the features on the seat back as discussed in relation to FIGS. 7A and 7B. As illustrated in FIG. 7D, the portions of the seat back with matching features is illustrated by overlapping section 760. As illustrated in FIGS. 7A-7D, a short section 755 of the back wall behind the table 710 is illustrated in FIGS. 7A, 7C, and 7D. A longer section 757 of the back wall behind the table 710 is illustrated in FIGS. 7B, 7C, and 7D.

As illustrated in FIG. 7D, the back wall (short section 755 and long section 757) violates the occlusion mechanism. If the red depth map associated with the RGB image in FIG. 7B were accurate, the camera (view point) associated with the grey depth map associated with the RGB image in FIG. 7A would not observe the back wall pattern, which is physically located behind the opaque object represented by the red depth map. In other words, if the relative pose based on the feature matching were correct, the short section 755 and the long section 757 would align. Instead, they are offset by the distance D. Type 5 pixels in FIGS. 6A and 6B are exemplary pairs that cannot pass this occlusion rule.

Aligned Point Count. This mechanism determines that a relative pose is miscategorized if the number of aligned depth points between the pair is less than a threshold. An image pair having an accurate relative pose may imply that their depth maps are well aligned and the number of aligned depth points is very large (e.g., over a predetermined threshold).

Pixel-Wise Difference. This mechanism determines the relative pose as miscategorized if a color discrepancy of the corresponding frames is too large. All depth points of a depth map have associated colors from a corresponding RGB image. Examples are the depth maps in FIGS. 7C and 7D and the corresponding RGB images in FIGS. 7A and 7B. The aligned depth points of a good relative pose can have well aligned colors. Color discrepancy can be accumulated over all the aligned depth points. By comparing the color difference between each pair of depth points and summing over a certain number of points, an overall color discrepancy can be quantized. Comparing the quantized overall color discrepancy with a predetermined threshold can determine the quality of the relative pose and be used to detect miscategorized poses.

FIG. 6A illustrates a matrix representation of relative poses generated from the Relative Pose Computation and detection and removal (i.e., marking) of steps 210 and 212. FIG. 6B illustrates a matrix representation of extended relative poses generated from the Extended Relative Pose Computation and the detection and removal (i.e., marking) of extended mischaracterized relative poses, described below with reference to steps 216 and 218. The axes of the matrix representations are frame numbers as described more fully below.

Each of FIGS. 6A and 6B illustrate an N×N matrix, where N is the frame number of a particular input image or image frame. Each pixel in each of the upper right or lower left triangles represents a pair of images frames comprising a first image frame corresponding to a column number of the pixel and a second image frame corresponding to a row number of the pixel. The elements of the matrix lying along the main diagonal have no value since the main diagonal merely compares an image frame to itself.

The pixel colors (i.e., values) in the top-right triangle of FIG. 6A represent the computation result achieved for determining the relative pose between given image frames. For example, circle 610 highlights image frame numbers 28×10 and 29×10. The relative pose between these two image frame pairs is computed at 210 as a valid relative pose and these image frame pairs are indicated in light green, as described more fully below, since there is a valid relative pose between these image frame pairs. Circle 612 highlights image frame numbers 1-10x~50-60. For these image frame pairs, some of the image frame pairs have valid relative poses (light green), while other image frame pairs have miscategorized relative poses (orange) as described more fully in relation to process 212.

The pixel colors (i.e., greyscale) in the bottom-left triangle of FIG. 6A represent the confidence value or level associated with the corresponding computed relative poses in the top-right triangle, with brighter pixel intensity indicating a higher confidence in the relative pose computation. The confidence in the computation is a function of one or more parameters according to embodiments of the present invention. For example, the confidence, which can also be referred to as a weight, can be a function of the number of the closest point pairs as discussed in relation to FIG. 9, which can be used a proxy for the size of the overlap area between an image frame pair. The confidence can be a function of the number of 3D feature matches between image frame pairs as determined by process 334. Additionally, the confidence can be lower when addressing extended valid relative pose for frame pairs in comparison with valid relative pose for frame pairs because the extended valid relative poses are based on the initial determination of the valid relative poses discussed in relation to processes 210-214.

FIG. 6C is a diagram illustrating a series of camera poses and image frames according to an embodiment of the present invention. In FIG. 6C, a series of camera poses as a function of time are illustrated by the blue triangles representing a camera that is moving through a global reference frame associated with coordinate axes 655. Associated depth maps are also illustrated in FIG. 6C. At camera pose 660, the camera captures a field of view associated with image frame 662 (tan), imaging the left bottom corner of the illustrated area. At camera pose 670, the camera captures a field of view associated with image frame 672 (red), imaging the top center of the illustrated area. At camera pose 680, the camera captures a field of view associated with image frame 682, imaging the top right corner of the illustrated area.

As illustrated in FIG. 6C, camera pose 660 is associated image frame 662, which shares no overlap with the image frame associated with camera pose 670 or camera pose 680. Referring to FIG. 6A, image frame pair 1×30 has no valid relative pose, indicating that the relative pose computation resulted in the determination that it is not possible to determine the relative pose of image frame 1 with respect to the pose of image frame 30. In contrast, camera poses 670 and 680 are associated with image frames 672 and 682, which share an overlap area. Accordingly, it may be possible to determine the relative pose between camera poses 670 and 680 based on common features present in the pair of associated image frames.

Similar to image frames 672 and 682, enough overlap and/or common information is present in frame pair 10 and 28 and frame pair 10 and 29 to reference these image frames (i.e., 10 to 28 and 10 to 29) to each other. In other words, image frames 10 and 28 can be referenced to each other, for example, the camera pose associated with image frame 10 is a predetermined pose ($P_{10}$). The camera pose associated with image frame 28 ($P_{28}$) can be referenced to $P_{10}$ by translation and rotation of the camera, for instance, translation of 100 cm along the x-axis and rotation of 30° around the y-axis.

FIG. 6A illustrates several conditions associated with the relative frame-to-frame pose computation:

Dark Grey (Type 1)—Uncategorized—An attempt to compute relative pose between image frame pairs was performed, but no relative pose between image frame pairs is present Light Grey (Type 1)—Uncategorized—No attempt to compute relative pose between image frame pairs was performed. No relative pose between image frame pairs is present Light Green (Type 2)—Valid relative pose between image frame pairs is present Orange (Type 4)—Miscategorized relative pose between image frame pairs (based on IMU Measurements) is present Black (Type 4)—Miscategorized relative pose between image frame pairs (based on Occlusion) is present It should be noted that although miscategorization based on IMU measurements or occlusion are illustrated in FIG. 6A, other miscategorizations based on other information are also included within the scope of the Type 4 category. As examples, rotation and position, aligned point count, pixel-wise difference, and the like.

Referring to the categories above, Type 1 frame pairs are referred to as uncategorized and include frame pairs for which an attempt was made to determine the relative camera pose, but no valid relative pose was found (dark grey) as well as frame pairs for which no attempt to determine a relative pose was attempted (light grey). As an example, no attempt to determine (i.e., compute) the relative pose could be made for frame pairs for which there are no common features present.

Referring once again to FIG. 2, the method 200 also includes estimating global poses using relative poses (214). Global pose estimation 214 can be conducted in a large-scale optimization framework, which can compute global poses for all image frames in the global coordinates. In this process, global pose estimation is utilized to reference image poses (e.g., all image poses) to global coordinates based on a number of constraints, including relative pose constraints, IMU constraints, plane constraints, smoothness constraints, and the like, as an element of a large-scale optimization problem.

Relative pose constraints can ensure resulting global poses satisfy the relative transformation described by the relative poses. IMU constraints can penalize deviation between rotation of a resulting global pose and its corresponding IMU measurement. Plane constraints can ensure wall surfaces are well aligned. As an example, for each depth maps, planes can be extracted. The process of referencing to global coordinates then performs alignment of these extracted planes. In embodiments in which a video stream input is utilized, smoothness constraints can make sure the camera movement is smooth. One of ordinary skill in the art would recognize many variations, modifications, and alternatives.

Figure 8:
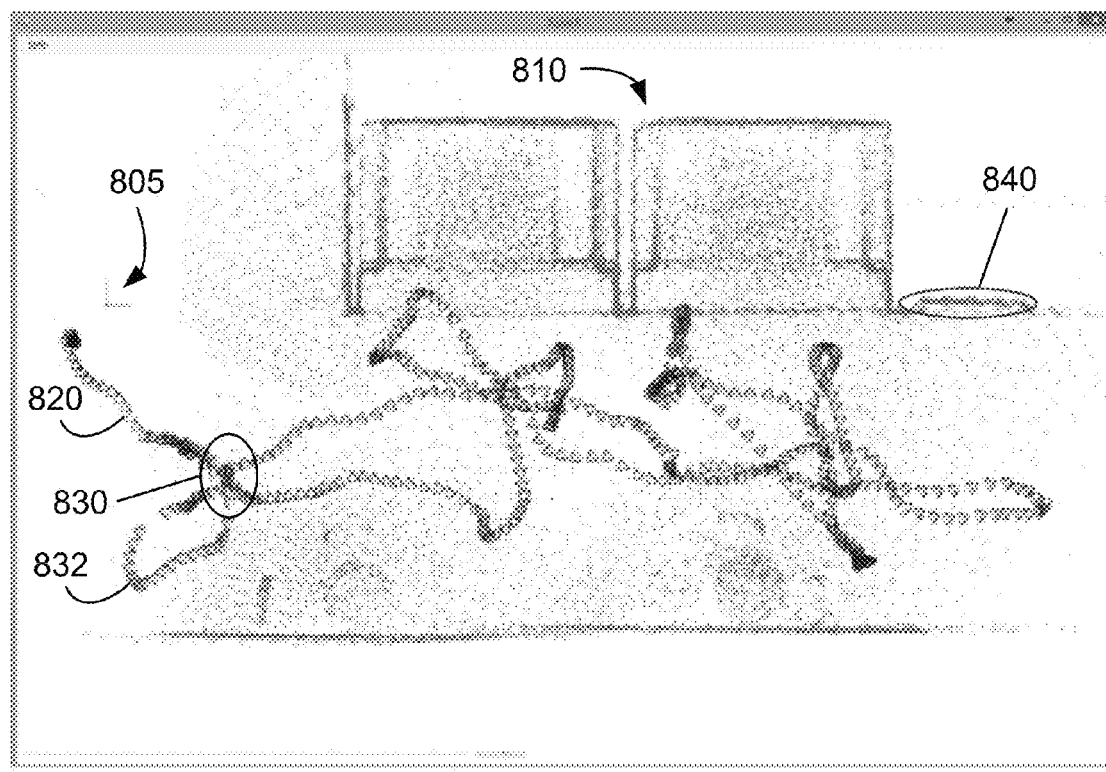
FIG. 8 illustrates a plan view showing depth maps and a series of image poses referenced to global coordinates according to an embodiment of the present invention.

In the global pose estimation process, the camera poses are recovered in global coordinates 805. Each camera pose and its associated RGBD image are placed in the space in a globally consistent manner. A large number of relative poses between image pairs are obtained from process 212 and this process estimates recovered camera positions following an original trajectory of capturing path, as shown in FIG. 8. FIG. 8 also shows the associated depth maps, visualized as point cloud, in global coordinates. For example, a line may represent a wall and when such lines of many images are superimposed, a crisp line may imply that the images are well-aligned and the associated pose estimation is accurate, while a thick line may imply the opposite.

FIG. 8 illustrates a plan view showing depth maps and a series of image poses referenced to global coordinates according to an embodiment of the present invention. In FIG. 8, all depth maps 810 associated with the multiple image frames are overlaid and referenced to global reference frame 805. Given the relative poses and the associated depth maps, an optimization process is performed to reference each camera pose to the global coordinates. The camera pose 820 for each image frame is illustrated as a function of time as the camera moves through the area. Thus, the recovered trajectory of the camera and its orientation as illustrated in FIG. 8 is provided after process 214.

After the RGBD poses have been registered in global coordinates, an improved spatial relationship among all the input RGBD images can be obtained as described below.

The method 200 includes computing extended relative poses (216), for example, after estimation of the global poses in process 214. The term extended relative pose is utilized since the number of valid relative poses is extended to a greater number because of the availability of the additional data, for example, spatial data. In this process, refinement of the relative poses is performed using the spatial information available and the output can be represented by the matrix representation of extended relative poses illustrated in FIG. 6B. In process 216, RGBD poses are registered in global coordinates, providing a much better understanding of the spatial relationship among all the input RGBD images. In other words, previously, relative poses may be computed for temporally close pairs and pairs having sufficient feature matches. In process 216, given the extended relative poses computed in process 214, since the poses are registered in global coordinates, relative poses for all spatially close pairs can be computed as discussed in relation to FIG. 9.

In some embodiments, processes 216-220 are only performed for frame pairs that are not valid after process 214. For example, the process can only be performed for Type 1 frame pairs (no valid relative pose) and Types 4 and 5 frame pairs (miscategorized relative pose) as illustrated in FIG. 6A. In some cases, miscategorized frame pairs can be correctly categorized since a better initialization is available at this stage of the method 200.

In the process illustrated in FIG. 3, the RGB information for the image frames was utilized, for example, in feature detection and matching. In contrast with processes 210-214, processes 216-220 have the global pose estimation information available. Referring to FIG. 8, camera poses in the vicinity of region 830 may be closely aligned, despite the fact that they may have been captured at different times, for example, before and after the camera moved through loop 832. For camera poses that are spatially close but temporally far, alignment can be attempted to determine if a valid relative pose between image frames if present.

Figure 9:
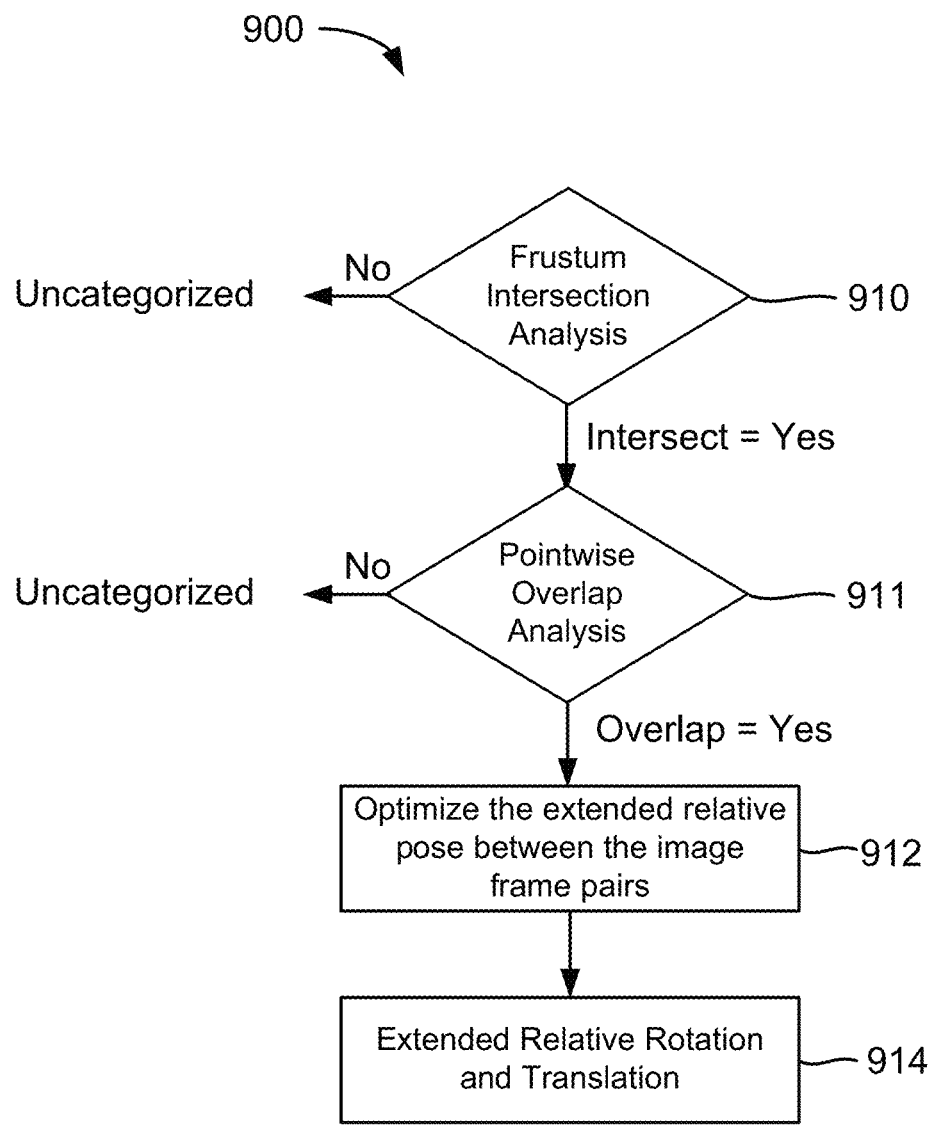
FIG. 9 a simplified flowchart illustrating a method of computing extended relative poses according to an embodiment of the present invention.

FIG. 9 a simplified flowchart illustrating a method of computing extended relative poses according to an embodiment of the present invention. Referring to FIG. 9, the method 900 includes determining if an image frame pair are spatially close image frames (processes 910 and 911). Spatially close frames, in this context, refers to image frame pairs that are characterized by an intersection between their fields of view, which can be characterized by the viewing range and the viewing direction, and overlap between point pairs. The field of view can also be referred to as a frustum.

In some embodiments, determining if image frame pairs are spatially close image frame pairs, as shown in FIG. 9, includes performing a frustum intersection analysis (910). For all image frame pairs other than the frame pairs with a valid relative pose, the frustum for each frame is compared to the frustum for the matching frame in the pair. If overlap in 3D is present, it is possible to determine that an intersection exists between the set of frustums. This intersection analysis is efficiently performed in some embodiments.

If two frustums are intersecting, this does not guarantee that objects in the two scenes intersect. For example, the two views may be of different sides of a wall, so although the frustums would intersect, there would not necessarily be objects that are present in both scenes. Referring once again to FIG. 6B, frustum intersection is illustrated by the overlap between the right side of field of view 672 and the left side of field of view 682.

If the intersection check in 910, which can be performed quickly, is passed, a more thorough pointwise depth map overlapping check can be performed (911). This can also be referred to as a determination if a sufficient number of closest point pairs exist for a given image frame pair. For each image frame pair, a determination is made of the overlap between point pairs in the two frames. By counting the number of close (e.g. under a given threshold) point pairs, the overlapping surface area can be attributed to the number of close point pairs. For each point in the first frame (Point a, Frame 1), a determination is made of the closest point in the second frame (Point b, Frame 2). For the second frame (Point b, Frame 2), a determination is made of the closest point in the first frame (Point c, Frame 1). If this closest point process forms a loop such that the point in the first frame (Point a, Frame 1) is the same as the closest point from the perspective of the second frame (Point c, Frame 1), then this point pair is counted. The number of close point pairs can be used as a proxy for the overlapping surface area in some embodiments.

These spatially close image frame pairs can then undergo extended relative pose optimization (912) to obtain a more accurate estimation of relative rotation and translation (914). Process 912 is similar to process 322 and process 914 is similar to process 340, but in the extended version.

It should be appreciated that the specific steps illustrated in FIG. 9 provide a particular method of computing extended relative poses according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6B illustrates several conditions associated with the extended relative frame-to-frame pose computation:

Dark Grey (Type 1)—Uncategorized image frame pairs—An attempt to compute relative pose between image frame pairs was performed, but no relative pose between image frame pairs is present Light Grey (Type 1)—Uncategorized image frame pairs—No attempt to compute relative pose between image frame pairs was performed. No relative pose between image frame pairs is present Light Green (Type 2)—Valid relative pose between image frame pairs is present Dark Green (Type 3)—Valid extended relative pose between image frame pairs is present Orange (Type 4)—Miscategorized relative pose between image frame pairs (based on IMU Measurements) is present Black (Type 4)—Miscategorized relative pose between image frame pairs (based on Occlusion) is present It should be noted that FIG. 6B includes a larger number of dark grey Type 1 frame pairs because, during the categorization process utilized in process 216, additional spatial information is utilized, enabling an increased number of attempted frame pair matches.

In the top-right triangles, Type 1 pixels represent image (frame) pairs having no relative poses found, Type 2 pixels represent image (frame) pairs with valid relative poses, Type 3 pixels represent image (frame) pairs with valid extended relative poses, and Type 4 pixels represent image (frame) pairs with miscategorized relative poses. In the bottom-left triangles, pixels represent confidence levels of the corresponding relative poses in the upper-right triangles. Brighter pixels indicate more confident relative poses.

In comparison with FIG. 6A, the density of valid relative poses is higher in FIG. 6B after performing the extended relative pose computation. For example, in region 650, a number of additional frame pairs have been added with a valid extended relative pose. Additionally, in region 655, frames that are not temporally close under some thresholds, have been identified as having a valid extended relative pose.

Referring once again to FIG. 2, the method includes detecting additional mischaracterized poses (218), which may be similar to process 212 described above and may include filtering out miscategorized relative poses from the newly generated extended relative poses. The method further includes estimating global poses using extended relative poses (220). In this process, constraints can be used, including, for example, all of the constraints utilized in the previous global pose estimation (214) plus the new extended relative pose constraints and structural shape constraints to obtain more accurate poses.

The method 200 additionally includes refining poses (222), which further improves pose accuracy. Pose refinement can add local consistency and accuracy to the pose estimation, as illustrated in FIG. 10.

Figure 10:
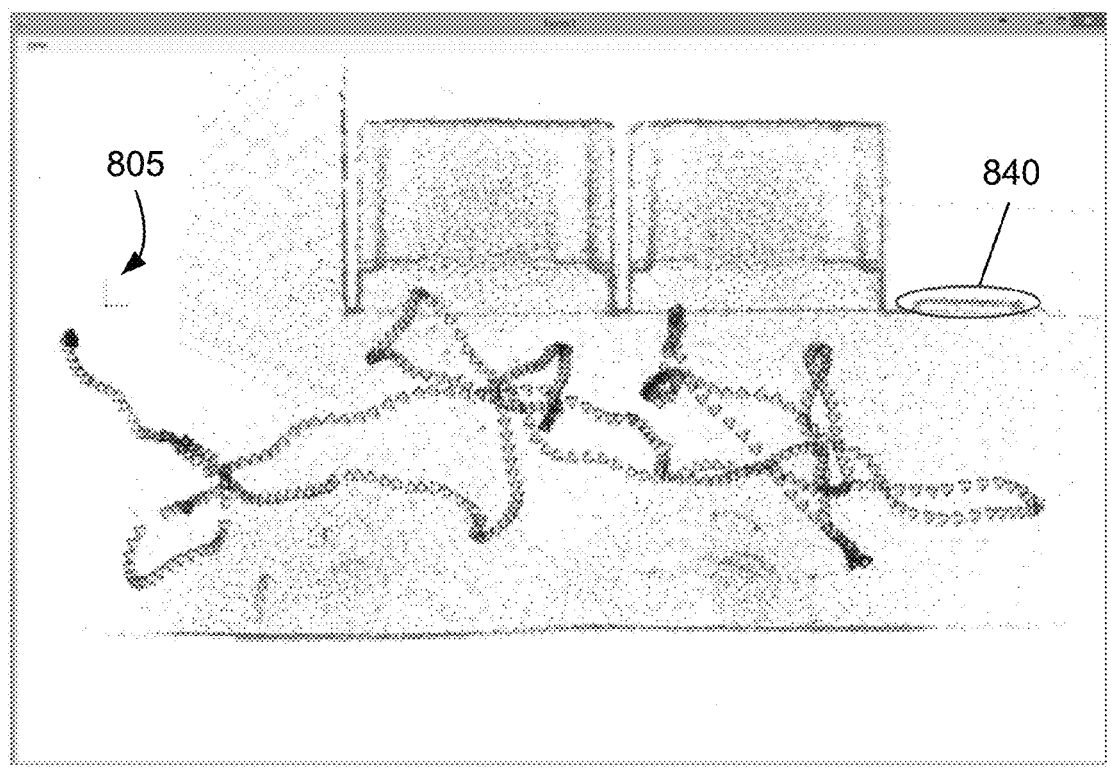
FIG. 10 illustrates a plan view showing depth maps and a series of refined image poses referenced to global coordinates according to an embodiment of the present invention.

FIG. 10 illustrates a plan view showing depth maps and a series of refined image poses referenced to global coordinates according to an embodiment of the present invention. FIG. 10 can be compared to FIG. 8, which illustrates a plan view showing depth maps and a series of image poses referenced to global coordinates before the image poses were refined. As can be seen by comparing FIGS. 8 and 10, the geometry represented by points, such as walls or other geometric features, are much crisper and cleaner after the poses are refined, which means that corresponding depth maps from different frames are better aligned and the associated estimated poses are even more accurate. As an example, wall 840 in FIG. 8 includes roughness that is not present in the same wall in FIG. 10 once the poses have been refined. One of ordinary skill in the art would recognize many variations, modifications, and alternatives.

The pose refinement can iteratively solve for the underlying scene geometry and the camera poses. With sufficiently close initialization and enough iterations, both the geometry and camera poses can converge to ground truth solutions as described below.

Figure 11:
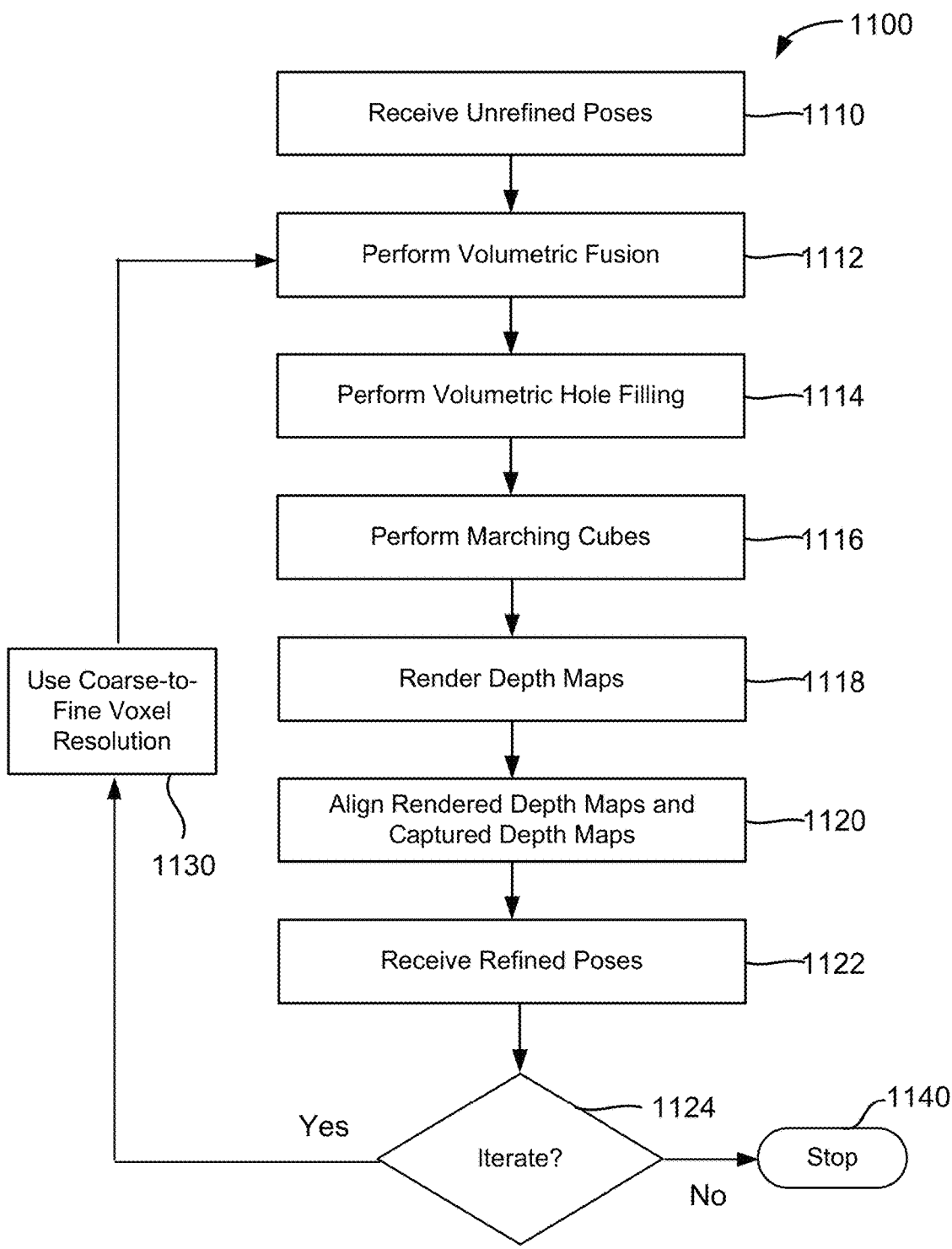
FIG. 11 a simplified flowchart illustrating a method for refining poses according to an embodiment of the present invention.
Figure 12A:
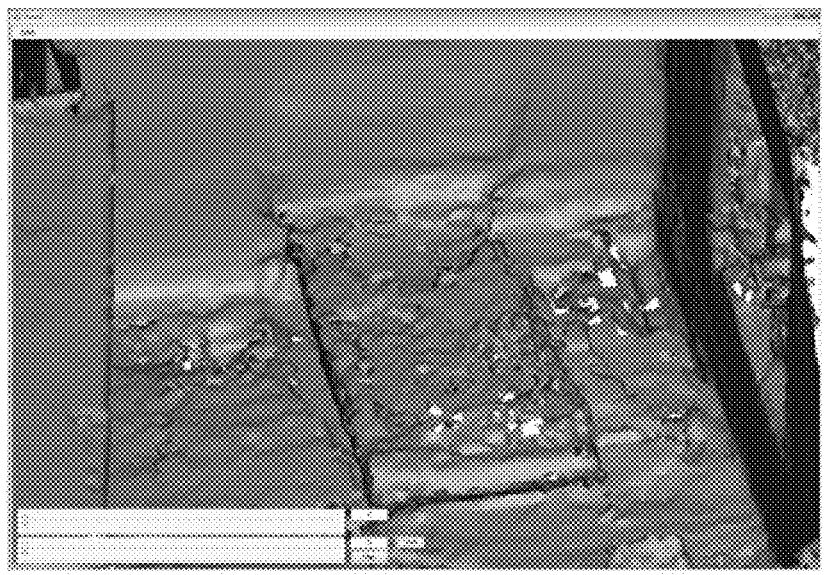
FIGS. 12A-12C are graphical representations illustrating 3D mesh results at different iterations of pose refinement according to an exemplary embodiment.
Figure 12B:
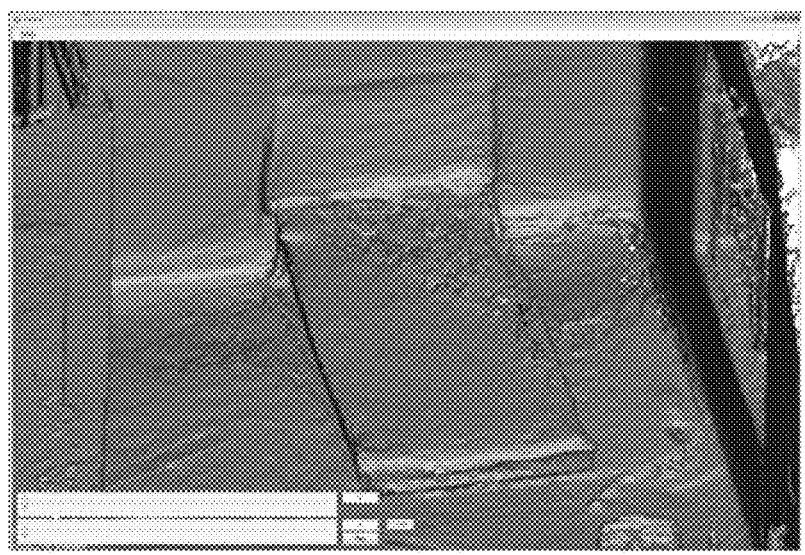
Figure 12C:
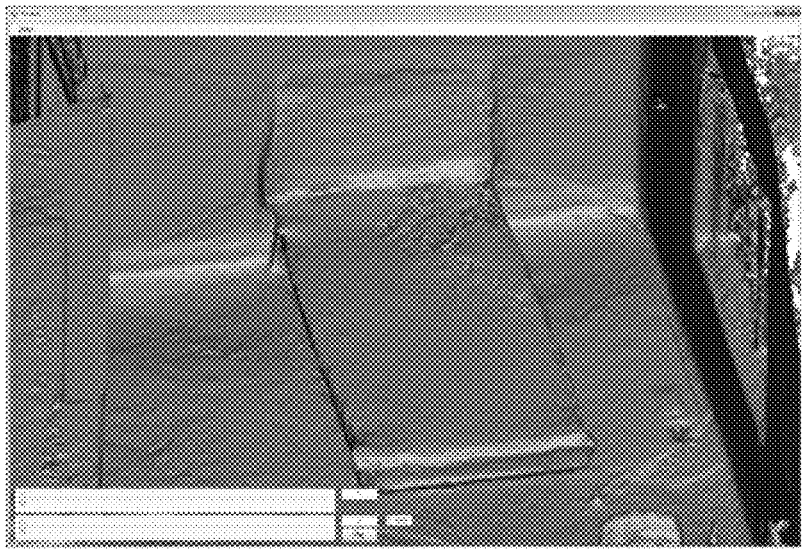

FIG. 11 a simplified flowchart illustrating a method for refining poses according to an embodiment of the present invention. Although the poses may be relatively accurate on a global scale, local inaccuracy can be removed using the method illustrated in FIG. 11. The method 1100 includes receiving unrefined poses (1110) and performing volumetric fusion (e.g., applying Curless and Levoy's algorithm) to fuse all the depth maps into a truncated signed distance function (1112). Volumetric hole filling is performed on the signed distance function (1114) (e.g., a volumetric diffusion based approach). The method 1220 also includes applying marching cubes (1116) to convert the signed distance function into a triangle mesh. Exemplary 3D meshes at various stages of refinement are illustrated in FIGS. 12A-12C.

Depth maps are rendered for each RGBD image (1118). In the depth map rendering process, the pose of each RGBD image is fine-tuned by aligning each depth image to the generated triangle mesh, i.e., aligning all depth images to each other. In one example, for each RGBD image, a depth map is rendered from the same camera pose. However, there can be differences between the rendered depth map and the captured depth map associated with each RGBD image, which mostly represent differences between the estimated pose and the ground truth pose. Thus, the rendered depth maps and the captured depth maps are aligned (1120). An ICP (iterative closest point) based alignment can be implemented against the rendered depth map to adjust the estimated pose.

The processes 1112-1116 can be considered as updating the geometry and processes 1118-1122 can be considered as updating the camera poses. One of ordinary skill in the art would recognize many variations, modifications, and alternatives.

Once the poses are refined/updated (1122), a decision is made with respect to iteration of the refinement process (1124). If iteration is performed, the geometry is updated again since the geometry can potentially be improved through use of the refined poses received at process 1122. The improved geometry in turn can be used to further refine the poses. This cycle can be repeated for N iterations, with modification of the coarse-to-fine voxel resolution (1130) at one or more or each of the iterations. In another embodiment, the number of iterations can be determined based on a threshold for the camera poses and/or differences in poses before and after the most recent iteration. After a sufficient number of iterations, the process is stopped (1140).

It should be appreciated that the specific steps illustrated in FIG. 11 provide a particular method of refining poses according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

FIGS. 12A-12C illustrate improved geometry over three iterations as described in relation to FIG. 11. Each of FIGS. 12A-12C is a 3D mesh generated via marching cubes from all input depth maps with estimated poses from each iteration. If the pose estimation is accurate, a smooth surface is observed; otherwise, a rough surface is observed. FIG. 12A shows, after one iteration, a representation of the captured image containing many rough surfaces. With progressively more iterations, a higher accuracy of the original scene is restored in FIGS. 12B and 12C. The iteration can continue until the poses reach very high accuracy after N iterations.

Referring once again to FIG. 2, in summary, embodiments of the present invention provide a method of determining camera poses for a plurality of image frames. The method includes capturing the plurality of image frames using a camera (e.g., an RGBD camera) and computing relative poses between each set of image frame pairs to provide a relative pose set and an uncategorized pose set. The relative pose set includes Type 2 (i.e., valid relative poses) and Type 4 (miscategorized relative poses) image frame pairs and the uncategorized relative pose set includes Type 1 image frame pairs. The plurality of image frames can be captured at a predetermined frame rate, for example, in a video implementation. The plurality of image frames can include color data as well as depth data for each pixel in each of the plurality of image frames.

As discussed in relation to FIG. 3, computing the relative poses between each set of image frame pairs can include performing a first process for a temporally close subset of the image frame pairs and a second process for a temporally far subset of the image frame pairs. The second process can include detecting and matching features between the image frame pairs in the temporally far subset. The second process can further include performing depth matching between the image frame pairs in the temporally far subset.

The method also includes detecting and removing miscategorized relative poses from the relative pose set to provide a remaining relative pose set. This remaining relative pose set will include Type 2 valid relative pose between image frame pairs, indicated by light green pairs in FIG. 6A. The method further includes determining global poses for the plurality of image frames using the remaining relative pose set.

Additionally, the method includes computing extended relative poses for at least a portion of the miscategorized relative poses and at least a portion of the uncategorized relative pose set to provide an extended relative pose set. This extended relative pose set will include Type 3 frame pairs with valid extended relative poses between image frame pairs, illustrated by dark green pairs in FIG. 6B and frame pairs with extended miscategorized relative poses (Type 4 frame pairs), indicated by orange and black frame pairs in FIG. 6B. An extended uncategorized relative pose set including new Type 1 frame pairs can also be present.

The method further includes detecting and removing extended miscategorized relative poses from the extended relative pose set to provide a remaining extended relative pose set, illustrated by the Type 3 remaining extended relative poses illustrated in dark green in FIG. 6B. The method also includes determining updated global poses for the plurality of image frames using the remaining relative pose set discussed in relation to process 214 and the remaining extended relative pose set. The global poses for the plurality of image frames are referenced to a global reference frame.

In some embodiments, the method also includes refining the updated global poses through N iterations, which can be a predetermined number of iterations or a number of iterations based on a threshold for differences in camera poses between iterations. Moreover, refining the updated global poses can include aligning scene geometry derived from depth maps associated with different image frames of the plurality of image frames. Refining the updated global poses can additionally include adjusting the updated global poses toward a convergence for each of the updated global poses.

It should be appreciated that the specific steps illustrated in FIG. 2 provide a particular method of performing large-scale RGBD pose estimation according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

The forgoing description has been presented for methods and systems for large scale RGBD estimation. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media. The modules/units described above may be implemented in a form of software, hardware, firmware, or any combination of software, hardware, and firmware. For examples, the modules/units may be implemented by a processor executing software instructions stored in the computer-readable memories.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of determining camera poses for a plurality of image frames, the method comprising:
    capturing the plurality of image frames using a camera;
    computing relative poses between each set of image frame pairs to provide a relative pose set, wherein computing the relative poses comprises performing:
        a first process for a first subset of the image frame pairs having a temporal separation between image frames of the image frame pairs less than a threshold; and
        a second process for a second subset of the image frame pairs having a temporal separation between image frames of the image frame pairs greater than the threshold;
    detecting and removing miscategorized relative poses from the relative pose set to provide a remaining relative pose set;
    determining global poses for the plurality of image frames using the remaining relative pose set;
    computing extended relative poses for spatially close image frame pairs to provide an extended relative pose set;
    detecting and removing extended miscategorized relative poses from the extended relative pose set to provide a remaining extended relative pose set; and
    determining updated global poses for the plurality of image frames using the remaining relative pose set and the remaining extended relative pose set.

2. The method of claim 1 further comprising refining the updated global poses through N iterations.

3. The method of claim 2 wherein refining the updated global poses comprises aligning scene geometry derived from depth maps associated with different image frames of the plurality of image frames.

4. The method of claim 2 wherein refining the updated global poses comprises adjusting the updated global poses toward a convergence for each of the updated global poses.

5. The method of claim 2 wherein refining the updated global poses through N iterations comprises performing a predetermined number of iterations.

6. The method of claim 2 wherein refining the updated global poses through N iterations comprises performing a predetermined number of iterations based on a threshold for differences in camera poses between iterations.

7. The method of claim 1 wherein the relative pose set includes valid relative poses and miscategorized relative poses.

8. The method of claim 1 wherein the extended relative pose set includes valid extended relative poses and extended miscategorized relative poses.

9. The method of claim 1 wherein the global poses for the plurality of image frames are referenced to a global reference frame.

10. The method of claim 1 wherein the camera comprises an RGBD camera.

11. The method of claim 1 wherein the plurality of image frames are captured at a predetermined frame rate.

12. The method of claim 1 wherein the plurality of image frames comprise color data and depth data for each pixel in each of the plurality of image frames.

13. The method of claim 1 wherein the second process comprises detecting and matching features between the image frame pairs in the second subset.

14. The method of claim 13 wherein the second process further comprises performing depth matching between the image frame pairs in the second subset.

15. The method of claim 1, wherein the first process comprises aligning depth data of the image frame pairs in the first subset.

16. The method of claim 1 further comprising determining that an image frame pair comprises a spatially close image frame pair.

17. The method of claim 16 wherein the spatially close image frame pair is determined by:
performing frustum intersection analysis; and
performing pointwise overlap analysis.

18. The method of claim 17, wherein performing frustum intersection analysis comprises comparing a frustum of a first image frame and a frustum of a second image frame to determine that the frustum of the first image frame and the frustum of the second image frame intersect.

19. The method of claim 17, wherein performing pointwise overlap analysis comprises:
(a) for a point in a first image frame, determining a closest point in a second image frame;
(b) for the closest point in the second image frame, determining a closest point in the first image frame;
(c) determining that the closest point in the first image frame is the same as the point in the first image frame; and
repeating (a)-(c) for each point in the first image frame.

20. The method of claim 19 wherein the intersecting frustums are characterized by a viewing range, a viewing direction, and an overlap between point pairs.

21. A non-transitory computer-readable storage medium comprising a plurality of computer-readable instructions tangibly embodied on the computer-readable storage medium, which, when executed by a data processor, determining camera poses for a plurality of image frames, the plurality of instructions comprising:
instructions that cause the data processor to capture the plurality of image frames using a camera;
instructions that cause the data processor to compute relative poses between each set of image frame pairs to provide a relative pose set, wherein computing the relative poses comprises performing:
a first process for a first subset of the image frame pairs having a temporal separation between image frames of the image frame pairs less than a threshold; and
a second process for a second subset of the image frame pairs having a temporal separation between image frames of the image frame pairs greater than the threshold;
instructions that cause the data processor to detect and remove miscategorized relative poses from the relative pose set to provide a remaining relative pose set;
instructions that cause the data processor to determine global poses for the plurality of image frames using the remaining relative pose set;
instructions that cause the data processor to compute extended relative poses for spatially close image frame pairs to provide an extended relative pose set;
instructions that cause the data processor to detect and remove extended miscategorized relative poses from the extended relative pose set to provide a remaining extended relative pose set; and
instructions that cause the data processor to determine updated global poses for the plurality of image frames using the remaining relative pose set and the remaining extended relative pose set.

22. The method of claim 1 wherein the spatially close image frame pairs are characterized by intersecting frustums.

23. The computer-readable storage medium of claim 21 wherein the plurality of instructions further comprise instructions that cause the data processor to refine the updated global poses through N iterations.

24. The computer-readable storage medium of claim 21 wherein the relative pose set includes valid relative poses and miscategorized relative poses.

25. The computer-readable storage medium of claim 21 wherein the global poses for the plurality of image frames are referenced to a global reference frame.

26. The computer-readable storage medium of claim 21 wherein the camera comprises an RGBD camera and wherein the plurality of image frames are captured at a predetermined frame rate.

* * * * *